(12) United States Patent
Koppert et al.

(10) Patent No.: US 7,735,709 B2
(45) Date of Patent: Jun. 15, 2010

(54) APPARATUS AND METHOD FOR JOINING PIPE ENDS TOGETHER

(75) Inventors: Frits-Jan Koppert, Nieuwerkerk a/d IJssel (NL); Cornelis van Zandwijk, Waddinxveen (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 1066 days.

(21) Appl. No.: 10/545,079

(22) PCT Filed: Mar. 28, 2003

(86) PCT No.: PCT/NL03/00240

§ 371 (c)(1),
(2), (4) Date: May 15, 2006

(87) PCT Pub. No.: WO2004/071702

PCT Pub. Date: Aug. 26, 2004

(65) Prior Publication Data

US 2007/0023479 A1    Feb. 1, 2007

(30) Foreign Application Priority Data

Feb. 14, 2003    (WO) .................... PCT/NL03/00114

(51) Int. Cl.
*B23K 9/12* (2006.01)
*B23K 9/028* (2006.01)

(52) U.S. Cl. ............. 228/47.1; 228/49.3; 228/103; 219/59.1; 219/60 R; 219/61; 219/60 A; 219/61.3

(58) Field of Classification Search ....... 228/47.1–49.3, 228/101, 103; 219/59.1, 60 R, 61, 61 A, 219/61.3, 61.5; 405/170

See application file for complete search history.

(56) References Cited

U.S. PATENT DOCUMENTS

| 263,132 | A | * | 8/1882 | Edison ................ 191/29 R |
| 3,890,482 | A | | 6/1975 | Dibenedetto |
| 4,373,125 | A | | 2/1983 | Kazlauskas |
| 6,313,426 | B2 | | 11/2001 | Belloni et al. |

FOREIGN PATENT DOCUMENTS

| EP | 1249295 A1 | 10/2002 |
| FR | 2223127 A | 10/1974 |

* cited by examiner

*Primary Examiner*—Jessica L. Ward
*Assistant Examiner*—Kevin E Yoon
(74) *Attorney, Agent, or Firm*—Browdy and Neimark, PLLC

(57) ABSTRACT

A method and apparatus for joining pipe sections (102, 104) together to form an underwater pipeline. The pipe sections (102, 104) are in an abutting position and have a generally vertical orientation. The apparatus comprises at least two welding equipment carriers (148, 152) and at least two welding heads (110, 112). Each welding head is connected to an equipment carrier (148, 152) by means of at least one umbilical (130, 132). The apparatus further comprises a welding head guide assembly (113) which is adapted to be fixed to one of said upper of lower pipe sections. The welding head guide assembly (113) guides the welding heads about the pipe sections (102, 104). The apparatus further comprises a guiding device (133) which guides the welding equipment carriers (148, 152) around said welding area (115). The welding equipment carriers (148, 152) are movable independently from one another.

10 Claims, 12 Drawing Sheets

APPARATUS AND METHOD FOR JOINING PIPE ENDS TOGETHER

FIELD OF THE INVENTION

The present invention relates to an apparatus and method for joining pipe ends together, such as in the offshore industry where in deep water, pipe sections are joined together vertically to form a pipeline which is lowered from a vessel to an underwater bottom. In such a pipe laying method, which is commonly referred to as a J-lay method, a plurality of pipe sections, welded to one another, together forming a part of the pipeline, hang down from a vessel in a substantially vertical direction, where an upper end of the most recently joined pipe section is to be welded to a lower end of a new pipe section being lined up above said upper end. In a specific embodiment of the J-lay method, the ends of the pipe sections are provided with collars for easier handling of the pipe sections. Upon completion of a weld, the end of the pipeline is gripped by the collar with a head clamp and lowered to just below the welding position to prepare for a new pipe section to be arranged above the upper end of the lowered pipeline.

DESCRIPTION OF THE PRIOR ART

From U.S. Pat. No. 6,313,426 a welding apparatus is known for welding pipe sections together to form an underwater pipeline. The pipe sections are in a generally upright orientation, the lower end of an upper pipe section abutting the upper end of a lower pipe section defining the current end of a pipeline. The apparatus includes a rotary equipment holder carrying welding equipment. The equipment holder is adapted to rotate about a generally vertical axis, and has a central opening through which pipe sections are able to pass as a pipeline is laid. A guide assembly is fixed around the end of a pipe section, and guides a plurality of welding heads which are angularly spaced around the pipe sections, along a guide track. The associated welding equipment is contained in the rotary equipment holder. Each welding head is associated with a respective sector of the rotary equipment holder, and is connected to the associated welding equipment situated in the respective sector by a flexible umbilical having a limited length. The respective sectors of the rotary equipment holder revolve around the pipe section as the associated welding heads revolve around the pipe section.

In a welding process performed with the known apparatus, a problem may arise when one or more of the welding heads revolve around the pipe section at a different angular speed than one or more other welding heads. Since the rotary equipment holder is a unitary device, each sector of the rotary equipment holder moves at the same angular speed around the pipe section. Consequently, when different welding heads move at different speeds, they come at different distances from their corresponding sector of the rotary equipment holder, which may unduly stretch one or more of the umbilicals. When this leads to damage of the umbilical, or a welding head which cannot perform its function properly, the weld to be made may contain welding errors which can only be repaired at high costs and at a substantial loss of time.

If the ends of the pipe sections are provided with collars, the end of the pipeline is gripped by the upper collar with a head clamp after completion of the weld, and the gripped end is lowered to below the welding position. A disadvantage of the known apparatus in relation to this specific embodiment is interference between the large head clamp and the welding equipment being in fixed positions in the rotary equipment holder.

SUMMARY OF THE INVENTION

It is an object of the present invention to provide a welding apparatus and method in which one or more of the welding heads may have speeds which are different from one or more other welding heads, without the risk of damage to an umbilical.

It is another object of the present invention to reduce the risk of interference between a head clamp used for lowering the pipeline, and the welding equipment.

According to the present invention, at least one of the above objects is reached in an apparatus for joining pipe sections together which are arranged in a generally upright position, a lower end of an upper pipe section being lined up with an upper end of a lower pipe section, the upper end and the lower end forming a welding area, the apparatus comprising: at least two welding equipment carriers; at least two welding heads, each welding head being connected to a respective one of the welding equipment carriers by means of at least one umbilical; a welding head guide assembly which is adapted to be fixed to one of said upper or lower pipe sections for guiding each welding head along said welding area; a guiding device for guiding said welding equipment carriers around said welding area; wherein the at least two welding equipment carriers are movable independently from each other.

Contrary to the prior art apparatus, where all sectors of the rotary equipment holder revolve with the same angular speed, in the apparatus according to the invention each welding equipment carrier is movable independently from another welding equipment carrier along a guiding device. Thus, each welding equipment carrier is movable in synchronism with its associated welding head, and any undue burden on the umbilical connecting the welding equipment carrier to the associated welding head can be avoided, thereby eliminating a potential source of welding errors.

One guiding device may be used for all welding equipment carriers, while it is also possible to use a separate guiding device for each welding equipment carrier.

In a preferred embodiment, which is easy to manufacture at relatively low costs, and requires little maintenance, the guiding device is stationary.

In another preferred embodiment, the guiding device is mounted below the welding area, and the welding equipment carriers are supported by the guiding device. In this embodiment, the welding equipment carriers and the umbilicals are easily accessible for a welding operator.

In another preferred embodiment, the guiding device is mounted above the welding area, and the welding equipment carriers are suspended from the guiding device. In this embodiment of the invention, the welding equipment does not interfere with welding operators who monitor a welding process. This provides a conveniently arranged working area.

In another preferred embodiment of the invention, the guiding device extends in a plane substantially at right angles to a longitudinal axis of the upper and lower pipe sections. The longitudinal axis of the upper and lower pipe sections may be slightly inclined to a vertical line. In these circumstances, the guiding device can be positioned relative to the inclined axis. This provides the advantage of minimizing any axial and radial displacements of the welding equipment carriers relative to the welding area, during a movement of the welding equipment carriers around a pipe section.

In a further preferred embodiment, the guiding device extends in a substantially horizontal plane. Advantageously, the welding equipment carriers can move around the pipe sections without making vertical displacements, thereby minimizing the effort to rotate the welding equipment carriers.

In a further preferred embodiment, the guiding device comprises at least one rail, and the welding equipment carrier comprises at least one wheel to be guided by the at least one rail. The rail or rails (for example, two parallel rails) may be arranged such that each welding equipment carrier rests thereon, or is suspended therefrom. The at least one wheel advantageously enables an easy movement of each welding equipment carrier along the rail.

In another preferred embodiment, an electrical power feed line extends around said welding area, and each welding equipment carrier comprises a slide contact for establishing an electrical connection between the power feed line and the welding equipment carrier. Thus the welding equipment carriers can rotate around the upper or lower pipe section for a large number of revolutions while at the same time being supplied with electrical power in a simple fashion. A limited movement of the welding equipment carriers due to a finite length of an electrical power cable is hereby avoided. With different slide contacts, different endless electrical connections for different purposes can be established.

In a preferred embodiment, each welding head comprises a controllable welding head drive for moving the welding head along the welding head guide assembly with a controllable speed. Advantageously, the welding process thus can be accurately controlled. According to a judgement of a welding operator, the movement in terms of position and speed of a welding head may be adapted. The welding operator may also perform measurements on the welding process and adapt the speed of the welding head on the basis of these measurements. The speed control may, however, also be obtained by generating a signal by one or more suitable sensors arranged to monitor the welding process at the corresponding welding head, and processing the sensor signal(s) to control a welding head speed, thus obviating or minimizing human intervention. It is also possible to control the welding head drive with predetermined, programmed instructions.

In a further preferred embodiment, each welding equipment carrier comprises a controllable welding equipment carrier drive for moving the welding equipment carrier along the guiding device with a controllable speed. The speed control of the welding equipment carrier drive may be obtained by a human operator monitoring the progress of the corresponding welding head, and adapting the speed on the basis of the observations made in order to keep the angular position of the welding equipment carrier relative to the welding area the same as the angular position of the associated welding head as much as possible.

Preferably, each welding head comprises a controllable welding head drive for moving the welding head along the welding head guide assembly with a controllable speed, and each welding equipment carrier comprises a controllable welding equipment carrier drive for moving the welding equipment carrier along the guiding device with a controllable speed, and wherein each welding head drive is coupled to a respective one of the welding equipment carrier drives for each welding equipment carrier to keep substantially a same angular position relative to the welding area as the associated welding head. Advantageously, the welding equipment carrier can keep substantially the same angular position relative to the welding area as the welding head, thus obviating or minimizing human intervention. In this case, a signal which is representative of the angular speed or position of one of the welding heads relative to the welding area may be generated by one or more suitable sensors. This signal may be transmitted wirelessly or by a hardwired connection to the welding equipment carrier drive through an associated umbilical. In the welding equipment drive, the signal is processed to control the angular speed and/or position of the associated welding equipment carrier. A hardwired connection provides the advantage of low sensitivity to interference, and a wireless connection provides the advantage of low costs and a simple construction.

Preferably each welding head comprises one or more welding torches. If one welding torch is applied for each welding head, this provides the advantage of a convenient welding arrangement which can be optimally controlled. If more than one welding head is applied for each welding head, more welding material can be deposited in a same period of time, thereby advantageously enabling a faster welding process.

In a further preferred embodiment, a first welding wire reel is mounted on each welding equipment carrier for supplying a welding wire to the associated welding head. Such a welding wire will be fed through the above-mentioned umbilical, which advantageously according to the present invention can be kept limited in length, and free of excess loads as a result of the synchronized movement of each welding head and its associated welding equipment carrier.

For a further improvement of the reliability of the feeding of the welding wire to the welding head, at least one second welding wire reel is mounted on one of the welding heads, each second welding wire reel being connected to the associated welding head by means of a welding wire feed line, for supplying a welding wire to the welding head. The second welding wire reel may be supplementary to the first welding wire reel, or may replace the first welding wire reel. When only a second welding wire reel is used, the umbilical is only required to carry gas, a cooling fluid, electrical leads and possibly optical leads from the welding equipment carrier to the associated welding head(s), which allows for a relatively long length of the umbilical, as opposed to the situation wherein the first welding wire reel is used, where the length of the umbilical is limited by the length of the welding wire which may pass through the umbilical without mechanical problems.

Preferably at least one equipment carrier is provided with a support, for supporting a welding operator. This provides the advantage that a welding operator can be transported by the welding equipment carrier at the same angular speed as the angular speed of the welding head, so that the welding operator can monitor and control the welding process from a convenient position. The welding operator does not need to walk, but he may stand or sit on the support. This increases the safety of the welding process, because the welding operator does not run the risk of tripping over, bumping into, or getting entangled in a part of the welding equipment such as an umbilical, a welding equipment carrier, a welding head or any other part of the equipment.

It is also possible to provide a control console which is mounted on the welding equipment carrier, so that a control environment is created which enables a welding operator to have a full control of the welding process.

In a further preferred embodiment, a platform for supporting an operator near the welding area is provided, an upper side of the platform extending in a substantially horizontal plane. In a simple and low cost construction, the platform may be stationary to enable the operator to follow the progress of the welding process in the welding area by walking around the pipe sections. In such an embodiment, the guiding device discussed above may be mounted to the platform, or on the upper side of the platform, in particular when the guiding device comprises one or more rails. The platform may also be rotatable around the lower pipe section, which would allow an operator to follow the progress of the welding process without having to walk on the platform much, in particular when the angular speed of the platform substantially corresponds to the angular speed of the welding head(s) to be monitored by the operator.

Preferably a part of each umbilical is supported by a support chain, which runs adjacent to the umbilical and with which the umbilical is connected at substantially regular intervals. The support chain strengthens the umbilical, prevents damage from wear and tear and prevents large forces to be exerted on the at least one umbilical.

In a further embodiment of the invention, an apparatus is provided for joining pipe sections together which are arranged in a generally upright position, a lower end of an upper pipe section being lined up with an upper end of a lower pipe section, the upper end and the lower end forming a welding area, the apparatus comprising at least two welding equipment carriers; at least two welding heads, each welding head being rigidly connected to a respective one of the welding equipment carriers; a guiding device for guiding said welding equipment carriers around said welding area; wherein the at least two welding equipment carriers are movable independently from each other.

Advantageously, this embodiment of the invention provides a relatively simple setup of the welding apparatus, and enables a straightforward mode of operation of the welding process, wherein each welding equipment carrier, with its welding head, performs a welding operation, independently from another welding equipment carrier and its respective welding head. An umbilical between a welding equipment carrier and a welding head is not necessary, because there is no relative movement of the welding equipment carrier and the associated welding head. A fixed connection for supplying electrical power, one or more welding wires, a cooling fluid gas and control signals through electrical and optical lines from the welding equipment carrier to the associated welding head can be easily provided.

In a further preferred embodiment, an apparatus is provided for joining pipe sections together which are arranged in a generally upright position, a lower end of an upper pipe section being lined up with an upper end of a lower pipe section, the upper end and the lower end forming a welding area, the apparatus comprising at least one welding equipment carrier; at least one welding head, each welding head being rigidly connected to a respective one of the welding equipment carriers; a guiding device for guiding said welding equipment carriers around said welding area, wherein each welding equipment carrier is rigidly connected to the guiding device; wherein the guiding device is rotatable around one of the upper and lower pipe sections, thereby moving each welding equipment carrier.

In this embodiment, during the welding process only one rotation occurs, i.e. the rotation of the guiding device around one of the upper and lower pipe sections. This provides the advantage of a simple mode of operation.

In another preferred embodiment the guiding device is removably and rotatably mounted on one of the upper and lower pipe sections. This provides an accurate positioning of the guiding device relative to the welding area and obviates the need for a separate mounting means for the guiding device.

In a further preferred embodiment, at least one of the upper and lower pipe sections comprises a collar near its respective pipe end, the guiding device being removably mounted on said collar.

When pipe sections provided with collars are used, such a collar may form an excellent base for mounting the guiding device, since the spatial orientation of the guiding device relative to the pipe sections is well-defined. The position and dimensions of the collar are even as accurate as allowing each welding equipment carrier to support one of the welding heads directly, either with or without the use of a welding head guide assembly as discussed before.

Preferably the guiding device is provided with a controllable guiding device drive for controllably rotating the guiding device with the welding equipment carriers rigidly connected thereto around one of the upper and lower pipe sections. Advantageously, the angular speed of the guiding device can be adapted to the requirements of the welding process.

In another preferred embodiment of the invention, an apparatus is provided for joining pipe sections together which are arranged in a generally upright position, a lower end of an upper pipe section being lined up with an upper end of a lower pipe section, said upper end and said lower end forming a welding area, the apparatus comprising at least one welding equipment station; at least one welding head, each welding head being connected to the at least one welding equipment station by means of at least one umbilical; a welding head guide assembly which is adapted to be fixed to one of said upper or lower pipe sections for guiding said at least one welding head along said welding area; an umbilical guide assembly, which comprises at least one support structure arranged around one of the upper and lower pipe sections, wherein the umbilical guide assembly is adapted to support the at least one umbilical around the circumference of the support structure.

This embodiment of the invention avoids the aspects of the synchronization of the movement of the equipment carriers altogether, and enables a weld of high quality to be performed in a single, continuous run. During the weld, the umbilical is supported around one of the pipe sections by the support structure. The umbilical is long enough to make at least half as many loops around the pipe sections as are necessary for the welding heads to complete the weld. The umbilical may comprise one or more welding wire lines for feeding welding wire to the at least one welding head. However, it is preferred to connect one or more welding wire reels to each welding head.

In a further preferred embodiment the support structure comprises a plurality of guiding means, said guiding means being adapted to guide the at least one umbilical around the circumference of the support structure. The guiding means limit or remove sliding between the umbilical and the support structure and enable the umbilical in an advantageous way to move around the support structure in order to follow the movement of the at least one welding head, while ensuring a proper connection between the at least one welding equipment station and the welding head. A guiding means may be a guiding post.

Preferably the support structure is adapted to rotate around one of the upper and lower pipe sections for facilitating the movement of the umbilical.

In a further preferred embodiment the guiding posts are movable in said support structure. It is possible to enable the guiding means to roll or glide along the support structure smoothly, thereby enabling a good guidance of the umbilical.

Preferably, at least one umbilical is connected to said guiding means at a plurality of positions along the umbilical. The at least one umbilical may be connected to the guiding means like a curtain, in which sections of the umbilical between the guiding means hang down in the form of an open loop. When two of the guiding means move towards each other, the shape of the section of umbilical between the two guiding means becomes a deep, narrow open loop and when the guiding means move apart, the shape of the section of umbilical between the two guiding means becomes a wide and shallow open loop. This advantageously enables the umbilical to stretch around the circumference of the support structure when the welding heads move along the welding area during the welding process. It also provides a flexible way of storing any surplus length of umbilical.

If at least one umbilical is connected to said guiding means at a plurality of positions substantially regularly spaced along the umbilical, the shape of the umbilical can become a regular pattern of dips, thus providing an orderly setup of the apparatus.

Preferably at least one guiding means is adapted to rotate around an axis thereof. The guiding means then can operate as a roller, on which the umbilical can roll around the circumference of the support structure without encountering a large sliding resistance.

In a further preferred embodiment, the support structure is spiral-shaped for guiding the at least one umbilical spirally along the circumference of the support structure. Advantageously, the umbilical can be guided for several complete windings around the circumference of the support structure, thereby enabling the umbilical to maintain the connection between the at least one welding equipment station and the at least one welding head.

In another preferred embodiment, the umbilical guide assembly comprises an umbilical guide trolley, which is adapted to move around the circumference of the support structure, for guiding a part of the umbilical towards said at least one welding head. In order to move the umbilical around the support structure, a force must be exerted upon it. An advantageous way of exerting this force is to provide an umbilical guide trolley which can pull the umbilical along the support structure.

Preferably the umbilical guide trolley comprises a controllable drive, for positioning the umbilical in a suitable position relative to the welding heads. The controllable drive provides the possibility of conveniently positioning the umbilical in a required location.

In another embodiment, the welding equipment station comprises at least one umbilical storage for storing at least a part of the umbilical. During the welding process, not all of the length of an umbilical may be required to connect the at least one welding equipment station to the at least one welding head. The umbilical storage can store the excess length of umbilical in an orderly fashion. If the umbilical storage comprises a biased umbilical reel, any excess length of umbilical may be automatically pulled inside the umbilical storage and wound onto the umbilical reel. If the umbilical storage comprises a controllable drive, for varying the length of umbilical which is supplied to the umbilical guide assembly, the length of umbilical inside the storage may be adequately controlled.

In a further preferred embodiment of the invention, the umbilical storage comprises a sheave with a spring, wherein said sheave and spring are adapted to support a portion of umbilical which is located between the welding equipment station and the umbilical guide assembly.

Preferably at least part of the umbilical is supported by a support chain, which extends adjacent to the umbilical and with which the umbilical is connected at substantially regular intervals. The support chain strengthens the umbilical, prevents damage from wear and tear and prevents large forces to be exerted on the at least one umbilical.

In another preferred embodiment, each welding head comprises a controllable welding head drive for moving the welding head along the welding head guide assembly with a controllable speed, and the at least one umbilical guide assembly comprises a controllable umbilical guide trolley for moving the umbilical along the support structure with a controllable speed, at least one welding head drive and the umbilical guide trolley being coupled to one another for the umbilical guide trolley to keep substantially the same angular position relative to the welding area as at least one of the welding heads. This embodiment provides the advantage of performing an automatic welding process, wherein the umbilical can connect the at least one welding head to the at least one welding station, even if the at least one welding head moves at a variable speed.

In the following, the aspects, features and advantages of the present invention will be elucidated further by reference to the annexed Figures illustrating exemplary embodiments. In the Figures, the same parts or parts having the same function have been identified with the same reference numeral.

BRIEF DESCRIPTION OF THE DRAWINGS

FIG. 9a shows a side view of a part of the welding apparatus of FIG. 9;

FIG. 9b shows a detailed top view of the part of the welding apparatus of FIG. 9a;

DESCRIPTION OF PREFERRED EMBODIMENTS

Figure 1:
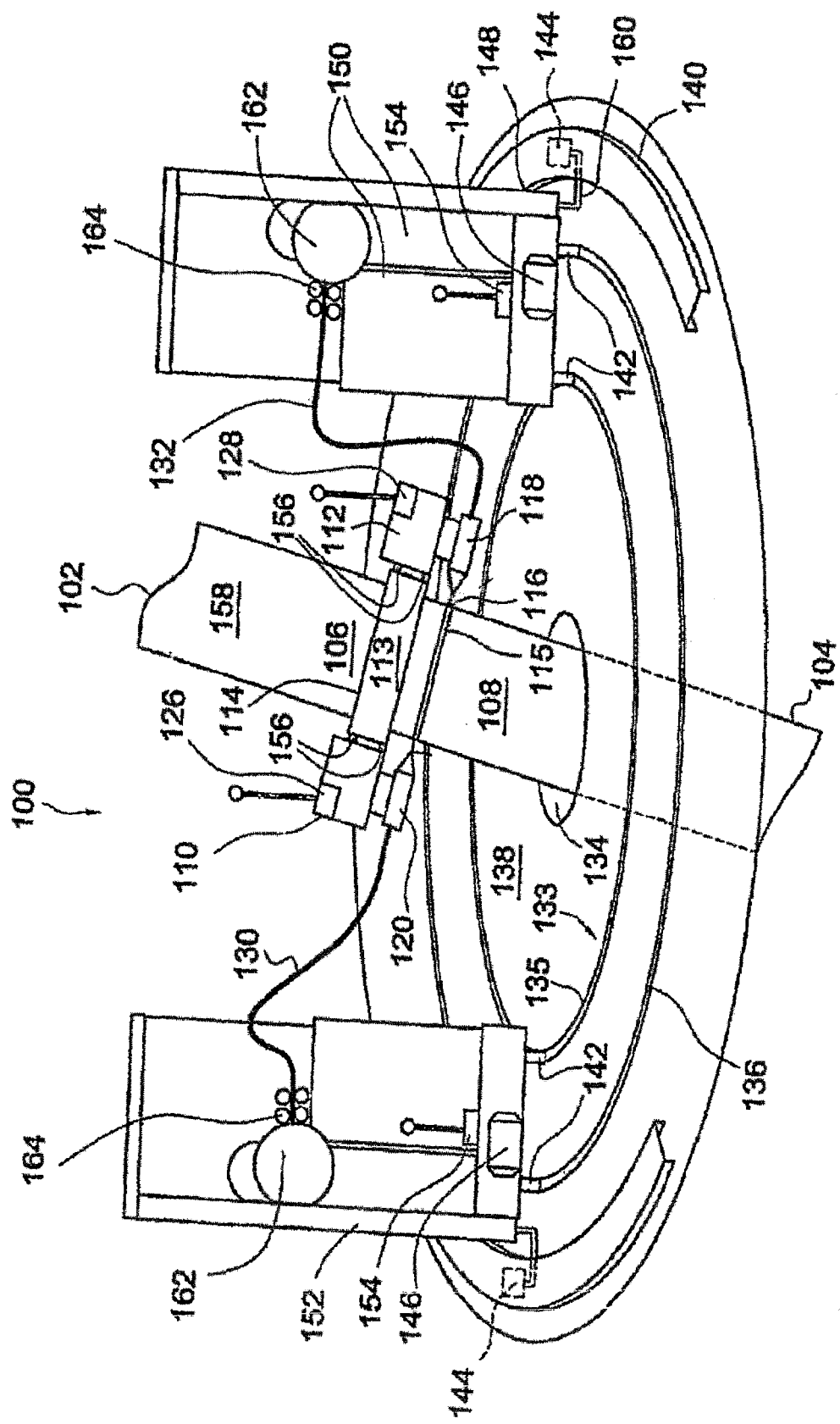
FIG. 1 shows a schematic perspective view of a welding apparatus in a first embodiment of the present invention.

FIG. 1 shows a welding apparatus 100, for joining an upper pipe section 102 to a lower pipe section 104. The apparatus 100 may be placed inside a housing (not shown). The two pipe sections 102 and 104 are substantially upright, and have an outer pipe surface 158. The upper pipe section 102 has a lower end 106 and the lower pipe section 104 has an upper end 108. The pipe sections are placed in a position, in which the ends 106 and 108 abut. The pipe sections 102, 104 usually have a circular cross-section, but e.g. an oval or elliptical cross-section is also possible.

The abutting lower end 106 and the upper end 108 have been pre-treated prior to the welding process, such that both ends have exactly the required shape. The abutting pipe ends 106, 108 may define a groove (not shown). The groove may have a substantial V-shape or a U-shape, or any other shape which is suitable to serve as a basis for a welded connection. The abutting pipe ends 106, 108 or the groove formed thereby define(s) a welding area 115.

A welding head guide assembly 113, comprising a guiding rails 114, is removably mounted near one of the ends 106, 108 of one of the two pipe sections 102, 104. In FIG. 1, the welding head guide assembly 113 is mounted on the end 106 of the upper pipe section 102. The welding head guide assembly 113 is ring-shaped and extends around the circumference of the pipe section 102, and is positioned at a predetermined distance from the welding area 115. The welding head guide assembly 113 has the same form as the pipe section 102, 104. In the situation wherein the pipe section 102, 104 is circular, the welding head guide assembly 113 is also circular. If the pipe sections 102, 104 are oval or elliptical, the guide assembly will be also oval or elliptical, respectively.

Two welding heads 110, 112 are movably connected to the welding head guide assembly 113. In a different embodiment, more than two welding heads may be used.

Each welding head 110, 112 is provided with at least one wheel 156, which rolls along the welding head guide assembly 113, thereby revolving the welding heads 110, 112 around the pipe section 102.

The welding head guide assembly 113 accurately determines the radial position of the welding heads 110, 112 relative to the welding area 115 and maintains a predetermined distance between the welding heads 110, 112 and the surface 158 of the pipe sections 102, 104. The welding head guide assembly 113 also determines the axial position of the welding heads 110, 112 with respect to the welding area 115.

Each welding head 110, 112 comprises at least one welding torch 118, 120. Preferably, two welding torches 118, 120 are comprised by each welding head 110, 112. The welding torch 118, 120 comprises a wire channel (not shown in detail), for feeding welding wire to the welding area 115. The welding torch 118, 120 also comprises a gas channel (not shown in detail), for feeding gas to the welding area 115. The welding torch 118, 120 further comprises fluid channels (not shown in detail), for passing cooling fluid through the welding torch 118, 120, with which the welding torch 118, 120 can be cooled during operation.

Each welding head 110, 112 may comprise a welding head drive (not shown in detail), preferably an electrical motor, for driving the welding head along the welding head guide assembly 113.

Each welding torch 118, 120 comprises a radial positioning device (not shown), for positioning the torch in a predetermined radial position with respect to the pipe sections 102, 104. In this manner, the radial distance from the welding torch 118, 120 to the welding area 115 may be accurately controlled.

An essentially ring-shaped, stationary platform 138, having a central opening 134, is mounted below the abutting ends 106, 108 of the pipe sections 102, 104. The stationary platform 138 extends in a substantially horizontal direction. The lower pipe section 104 passes through a central opening 134 of the platform 138.

A guiding device 133 is provided, comprising an inner track 135 and an outer track 136, both forming a loop around the central opening 134 and being mounted on the platform 138. The guiding device 133 may be removably positioned around the pipe sections 102, 104.

Proximal to the tracks 135, 136, a ring-shaped power feed line 140 is mounted. The power feed line 140 provides electrical energy necessary for the welding process. The power feed line 140 may be arranged on the inside of the inner track 135 or on the outside of the outer track 136, or between the inner track 135 and the outer track 136. The power feed line 140 may also be mounted higher or lower than the tracks 135, 136, and may comprise several separate electrical circuits (not shown).

Two welding equipment carriers 148, 152, having wheels 142 are placed on the tracks 135, 136 and are adapted to be conveyed along these tracks. In another embodiment of the invention, one welding equipment carrier may be used or a number of welding equipment carriers 148, 152 greater than two, and one or more welding heads may be connected to one welding equipment carrier.

Each welding equipment carrier 148, 152 has a power line 160. The power line connects the electrical converter to at least one slide contact 144. A slide contact 144 is slidably connected to the power feed line 140 for feeding electrical current from the power feed line 140 to the power line 160.

Each welding equipment carrier 148, 152 may be provided with a drive 146 for conveying the carrier along the tracks 135, 136. The drive may be electrical and fed through the slide contacts 144 by the external power feed line 140, or rechargeable batteries, stored on board the welding equipment carrier 148, 152, or it may be powered by an internal combustion engine on the welding equipment carrier. A hydraulic or pneumatic drive may also be possible, as long as the welding equipment carriers 148, 152, are movable along the tracks 135, 136 with a predetermined direction, distance and speed. The welding equipment carriers 148, 152 may also be conveyed along the tracks 135, 136 manually.

Instead of rolling on wheels, the welding equipment carriers may be moved in another way, like gliding.

Each welding equipment carrier 148, 152 carries welding equipment 150. The welding equipment 150 may comprise a gas storage, means for cooling and circulating fluid, an electrical power feed, an electrical converter and a welding wire storage means such a welding wire reel 162. The welding equipment 150 of each welding equipment carrier 148, 152 is connected to a respective welding head 110, 112 by means of an umbilical 130, 132, respectively.

Each umbilical 130, 132 guides different fluids and electrical energy from the welding equipment carriers 148, 152 to the welding heads 110, 112. The umbilical 130, 132 may comprise a hollow tube of flexible material, such as rubber, through which the different connections between the welding equipment carriers 148, 152 and the welding heads 110, 112 run. It may also comprise a flexible cable or chain, to which the different connections between the welding equipment carriers 148, 152 and the welding heads 110, 112 are fastened, for instance at substantially regular intervals. It may also comprise other elements, as long as they support the connections and hold these connections together for ease of handling, safety and operational reliability.

Through each umbilical 130, 132 a gas supply line, cooling fluid supply and return lines, an electrical power feed line and a welding wire feed line are each connected with the welding heads 110, 112.

The welding wire storage means 162 may be a welding wire reel, or a drum, or any other means suitable for storing welding wire. The gas storage comprises gas cylinders storing gas.

The welding wire (not shown) is pulled off the welding wire reel 162 and driven along the umbilical 130, 132 to the welding torch 118, 120 by a wire feeder 164. It is also possible to provide a second welding wire reel (not shown) mounted to the welding head. The second welding wire reel may be provided in addition to the first welding wire reel 162, or instead of the first welding wire reel 163.

The cooling means comprise a pump, channels through which the cooling fluid is pumped by the pump, and a heat exchanger for cooling the fluid.

The welding apparatus 100 comprises a control device (not shown in detail), which comprises a number of control modules. A control module is associated with each welding head 110, 112, and associated with each welding equipment carrier 148, 152.

The welding apparatus 100 also comprises a communication device. The communication device comprises a number of communication modules 126, 128, 154. Each welding head 110, 112 and each welding equipment carrier 148, 152 comprises a communication module. Consequently, the welding heads 110, 112 and the welding equipment carriers 148, 152 each comprise a control module and a communication module.

This communication device may e.g. be a radio system, a hardwired data transport system which runs through the umbilical 130, 132, or an infrared data transport system. Each communication module 126, 128 is adapted to transmit data signals from the welding heads 110, 112 to the communication module of a corresponding welding equipment carrier 148, 152, and to receive signals from the welding equipment carrier. The communication modules 126, 128 of the welding heads 110, 112 may also transmit signals to a remote console (not shown), operated by an operator, and receive signals from this remote console, which also comprises a control module and a communication module. The welding apparatus 100 may be operated by the remote console.

The welding head drive of the welding head 110, 112 is controllable through the associated control module, with which the position and/or speed of the welding head 110, 112 can be accurately controlled. The control may be an automatic process, or a manual process, controlled by a human operator.

The control module associated with each welding head 110, 112 controls the radial positioning device of the welding torch 118, 120. A welding operator may input control signals to his console. The console may send these signals through its communication module to the communication module 126, 128 of the welding head 110, 112 and from there to its control module.

In another embodiment, sensors measure the distance from the welding torch to the welding area. The control module of the welding head may control the radial position of the torch by processing the measurements.

The apparatus of FIG. 1 operates as follows. During welding, the welding heads 110, 112 revolve around the pipe ends 106, 108 guided by the welding head guide assembly 113. A weld 116 is created by the welding torches 118, 120, joining the pipe sections 102, 104 together. The weld is created starting from the inside of the pipe ends 106, 108. The first layer of welding material is deposited, and for each time a welding head 110, 112 passes by a certain section of the welding area 115, a new layer of welding material is created, thereby forming the weld 116.

The welding equipment carriers 148, 152 revolve around the pipe ends 106, 108 at substantially the same angular speed as the welding heads 110, 112, thereby maintaining the distance between the welding equipment carriers 148, 152 and their respective welding heads 110, 112 substantially smaller than the length of their respective umbilical 130, 132, thereby ensuring that the welding heads 110, 112 can be fed through the umbilical 130, 132 by the welding equipment 150 in the welding equipment carriers 148, 152 which feeds gas, cooling fluid, electrical power and welding wire to each welding head 110, 112.

The welding heads 110, 112 and the welding equipment carriers 148, 152 communicate with one another by means of the communication devices 126, 128 and 154. The welding head 110, 112 transmits its position and speed to the associated welding equipment carrier 148, 152, which enables the welding equipment carrier 148, 152 to know the exact location of the welding head 110, 112, to which it is connected via the umbilical 130, 132. The welding head 110, 112 may transmit information such as a start or stop signal to the welding equipment carrier 148, 152, causing it to start or stop moving.

Both welding heads 110, 112 and their respective welding equipment carriers normally need to perform several rotations around the pipe ends 106, 108 to complete the weld 116 between the pipe ends 106, 108. During welding, the welding heads 110, 112 may revolve around the pipe ends 106, 108 at different angular speeds, provided they do not touch one another. In general, during welding the welding heads will be substantially regularly spaced around the circumference of the pipe section 102, 104.

During welding, the platform 138 may be in a fixed position, or may be rotating. In a rotating embodiment of the platform, a drive (not shown) for rotating the platform 138 is mounted. This may be an electrical engine, a combustion engine or a drive powered by pressurized gas or fluid. The drive is controllable in order to accurately control the position and the speed of the platform 138. The drive may be adapted to rotate the platform 138 in both a clockwise direction and a counter-clockwise direction. The drive may be manually controlled or automatically controlled, in conjunction with the control of the welding head 110, 112 and the welding equipment carrier 148, 152.

The platform 138 provides a workspace for welding operators (not shown). The operators stay close to the welding heads 110, 112 during welding to monitor and control the welding.

Figure 2:
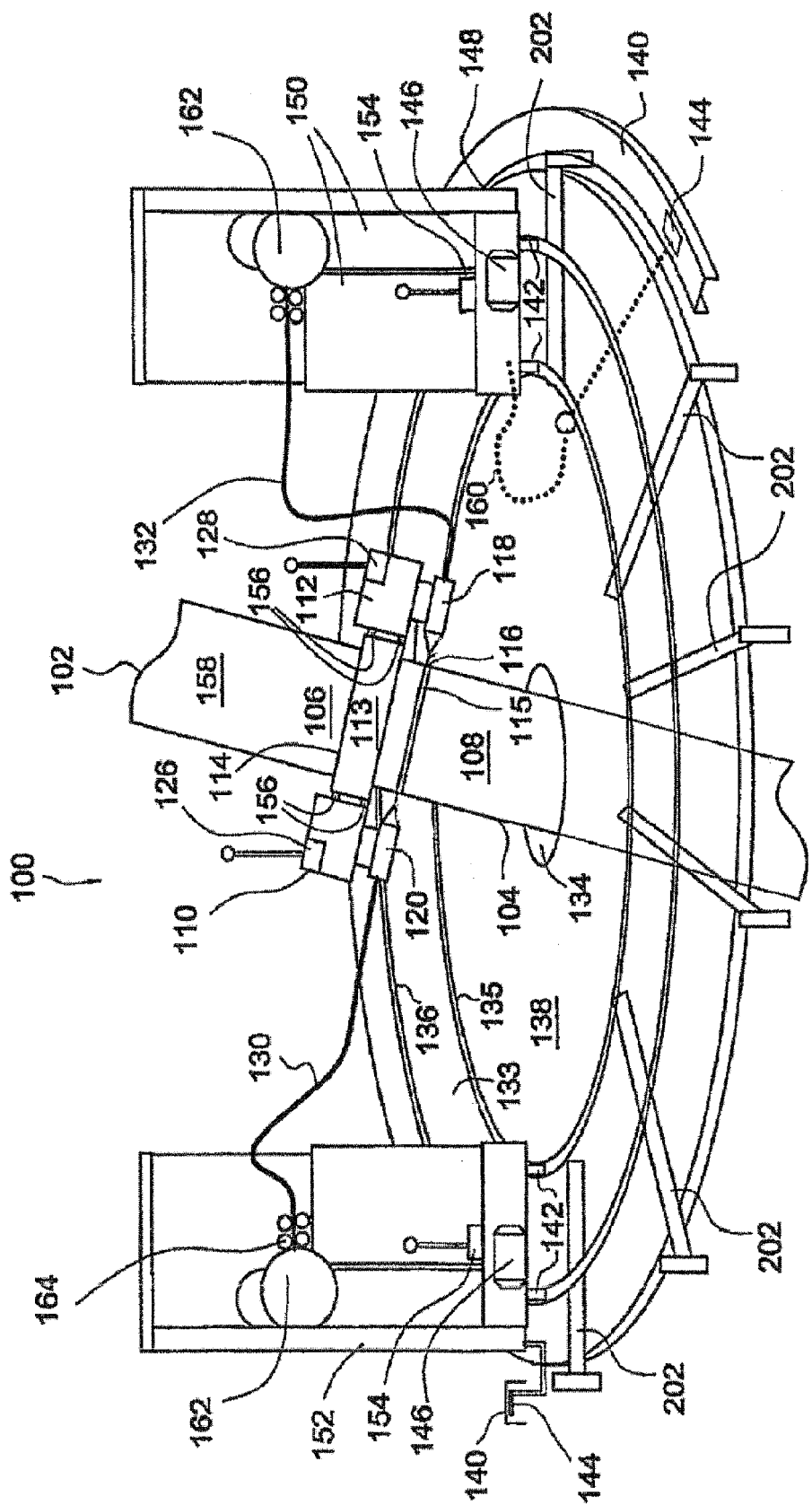
FIG. 2 shows a schematic perspective view of a welding apparatus in a second embodiment of the present invention.

FIG. 2 shows an apparatus according to the invention, in which the tracks 135, 136 are mounted on supports 202 which cantilever above a platform 138.

The supports 202 may be mounted to a housing in which the welding apparatus 100 is placed. The supports 202 are mounted above the platform 138. The supports 202 are substantially regularly spaced along the tracks 135, 136, preferably at equiangular distances with respect to the longitudinal axis of the pipe. The supports 202 are not in contact with the platform 138. The tracks 135, 136 are connected to the supports 202 by means of suitable connection means (not shown). The supports 202 and the connection means are strong enough to carry the dynamic loads of welding equipment carriers 148, 152 passing.

In the embodiment shown in FIG. 2, the platform 138 carries no equipment, but it serves as a platform from which a welding operator can operate the welding apparatus 100. The platform 138 may be fixed, or may be rotatable. The welding equipment carriers 148, 152 revolve around the pipe sections 102, 104, rolling on the tracks 135, 136.

A power feed line 140, having the shape of a closed loop around the pipe sections 102, 104 is mounted with a fixed connection to the supports 202. It may be mounted on the inside of the inner track 135, between the tracks 135 and 136, or on the outside of the outer track 136. The power feed line 140 may also be mounted higher or lower than the tracks 135, 136, and may comprise several separate electrical circuits (not shown). The power feed line 140 is suitable for guiding slide contacts 144. The welding equipment carriers 148, 152 comprise a power line 160 which is connected to a sliding contact 144. The power line 160 may be a flexible connection, or a non-flexible connection. The slide contact 144 connects the power line 160 to the power feed line 140.

The welding equipment carriers 148, 152 are positioned with respect to the welding heads 110, 112 in the same way as explained above in relation to FIG. 1.

In an alternative embodiment, the power feed line 140 may be mounted on the platform 138. In this variant the power line 160 will be a flexible connection, connecting the welding equipment carrier 148, 152 with a power feed line 140. If the platform 138 is a rotating platform, then the position and speed of the welding equipment carriers 148, 152 may be linked with the position and the rotational speed of the platform 138, by means of proximity switches (not shown), or manually.

The welding equipment carriers 148, 152 may comprise gas storage means (not shown). In another embodiment of the invention, a gas storage tank is mounted on the platform 138, and connected to the welding equipment carriers 148, 152 through a flexible connection. Also in this embodiment, the platform 138 is a rotating platform, and the position and speed of the welding equipment carriers 148, 152 is linked with the position and the rotational speed of the platform 138. This will ensure the gas supply to the welding equipment carrier 148, 152, thus eliminating the need to provide gas storage equipment on the welding equipment carriers.

Figure 3:
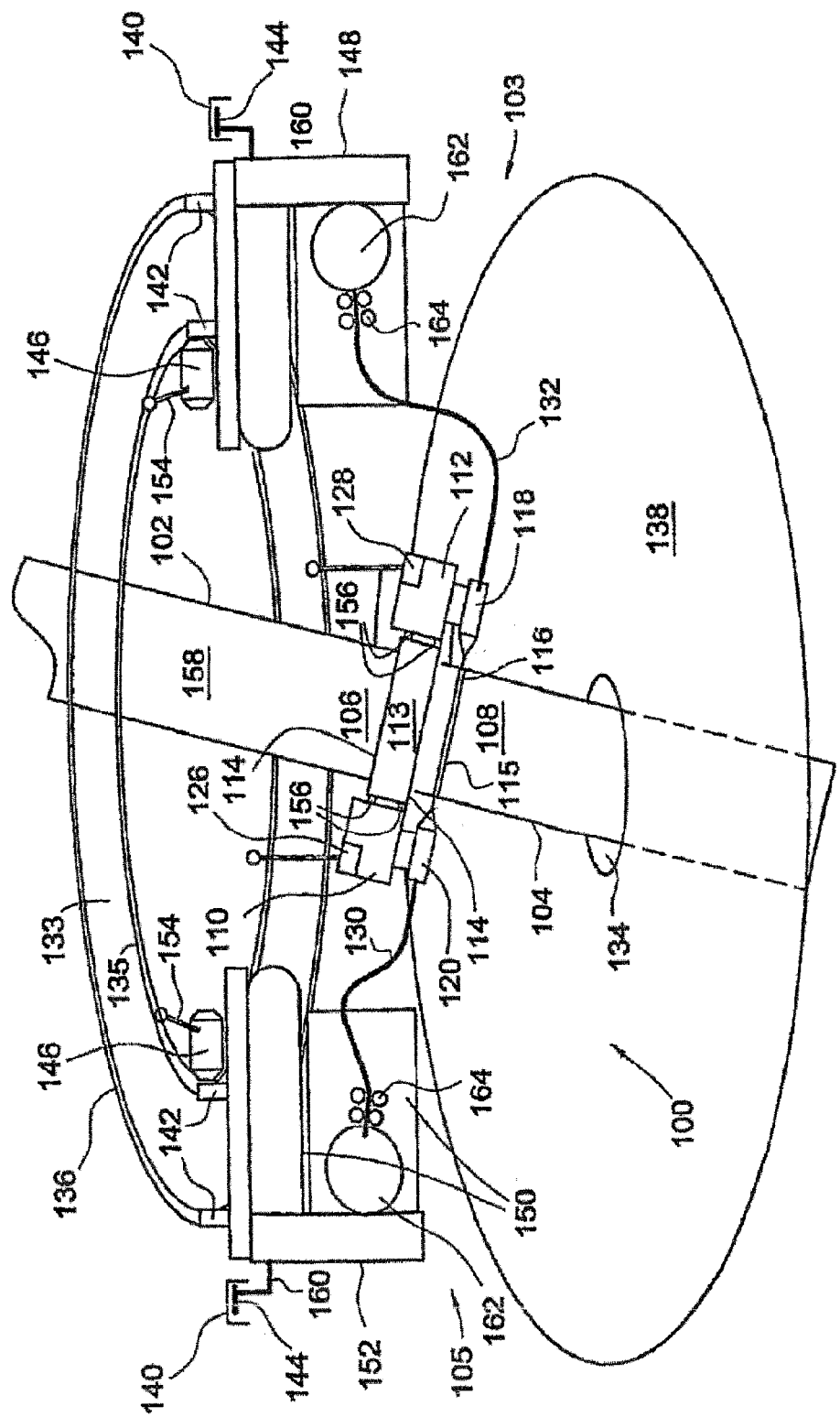
FIG. 3 shows a schematic perspective view of a welding apparatus in a third embodiment of the present invention.

FIG. 3 shows an apparatus according to the invention, in which the tracks 135, 136 are mounted above the pipe ends 106, 108. The tracks 135, 136 may be mounted in proximity to the welding apparatus 100, for instance mounted to a housing. The tracks 135, 136 are mounted above the welding operators, enabling the welding operators to move freely about the platform 138.

The welding equipment carriers 148, 152 are suspended from the tracks 135, 136. The weight of the welding equipment carriers 148, 152 is transferred through carrier wheels 142 onto the tracks 135, 136. A power feed line 140, having a loop shape around the pipe section 102, is mounted proximal to the tracks 135, 136. Like in FIGS. 1 and 2, the welding equipment carriers 148, 152 can revolve around the pipe sections and are driven by a driving means 146. The welding equipment carriers 148, 152 further comprise a communication module 154.

A welding head guide assembly 113 is mounted on the lower end 106 of the upper pipe section 102. The welding head guide assembly 113 is removable from the pipe section 102. Two welding heads 110, 112 are movably mounted on the welding head guide assembly 113. They are connected to the welding head guide assembly 113 by means of wheels 156.

In FIG. 3, the platform 138 carries no equipment, but it is a practical and safe working environment for the welding operators (not shown). The platform 138 may be fixed or may be rotatable.

The power feed line 140 may also be mounted to the platform 138; the electrical power for a welding process will then be obtained from the power feed line 140 by means of a flexible power line 160, which is connected with a sliding contact 144, which can slide in contact with the power feed line 140.

The embodiment of FIG. 3 may also be combined with a rotating platform, which permits the welding operators to stay in the same angular position as the welding heads 110, 112 during operation, without having to walk along the welding area.

Alternatively, a gas storage tank (not shown in detail) is mounted to the platform 138, which rotates at the same speed as the welding equipment carriers 148, 152. The welding equipment carriers 148, 152 are connected to the gas storage tank through a flexible connection. The gas storage tank may also be integrated in the platform 138, or mounted to the underside of the platform 138. In this case, the gas supply can run through an opening in the platform from the gas storage tank to the welding equipment carriers 148, 152.

Figure 4:
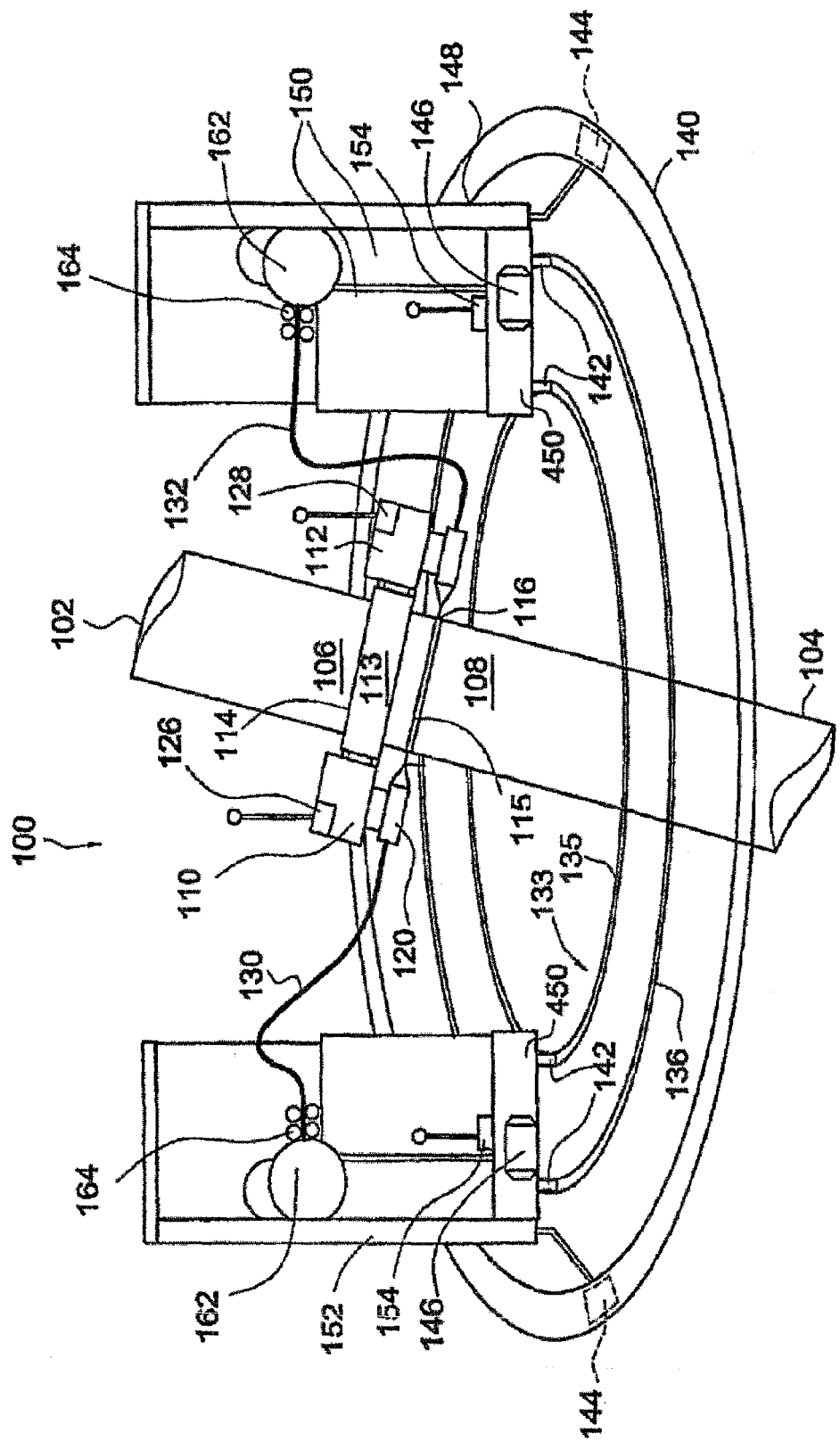
FIG. 4 shows a schematic perspective view showing a welding apparatus in a fourth embodiment of the present invention.

FIG. 4 shows a welding apparatus which is similar to the welding apparatus of FIG. 1. However, in FIG. 4, the welding equipment carriers 148, 152 are equipped with supports 450. These supports 450 can hold a welding operator (not shown). These supports may also be provided in FIGS. 1-3 and FIG. 5 (see below).

The supports 450 may be provided in the form of a platform on which a welding operator can stand. It is also possible to provide the support 450 in the form of a seat, on which a welding operator can sit.

In use, the supports 450 have the function of carrying the welding operator along the welding area 115. In this way, the welding operator does not need to walk, but he will automatically be in the correct position for monitoring the welding process.

Proximal to the support 450, a console (not shown) may be provided, which enables a welding operator to control the welding process when he is located on the support 450.

In the embodiment of FIG. 4, a stationary or a rotating platform 138 may be provided.

Figure 5:
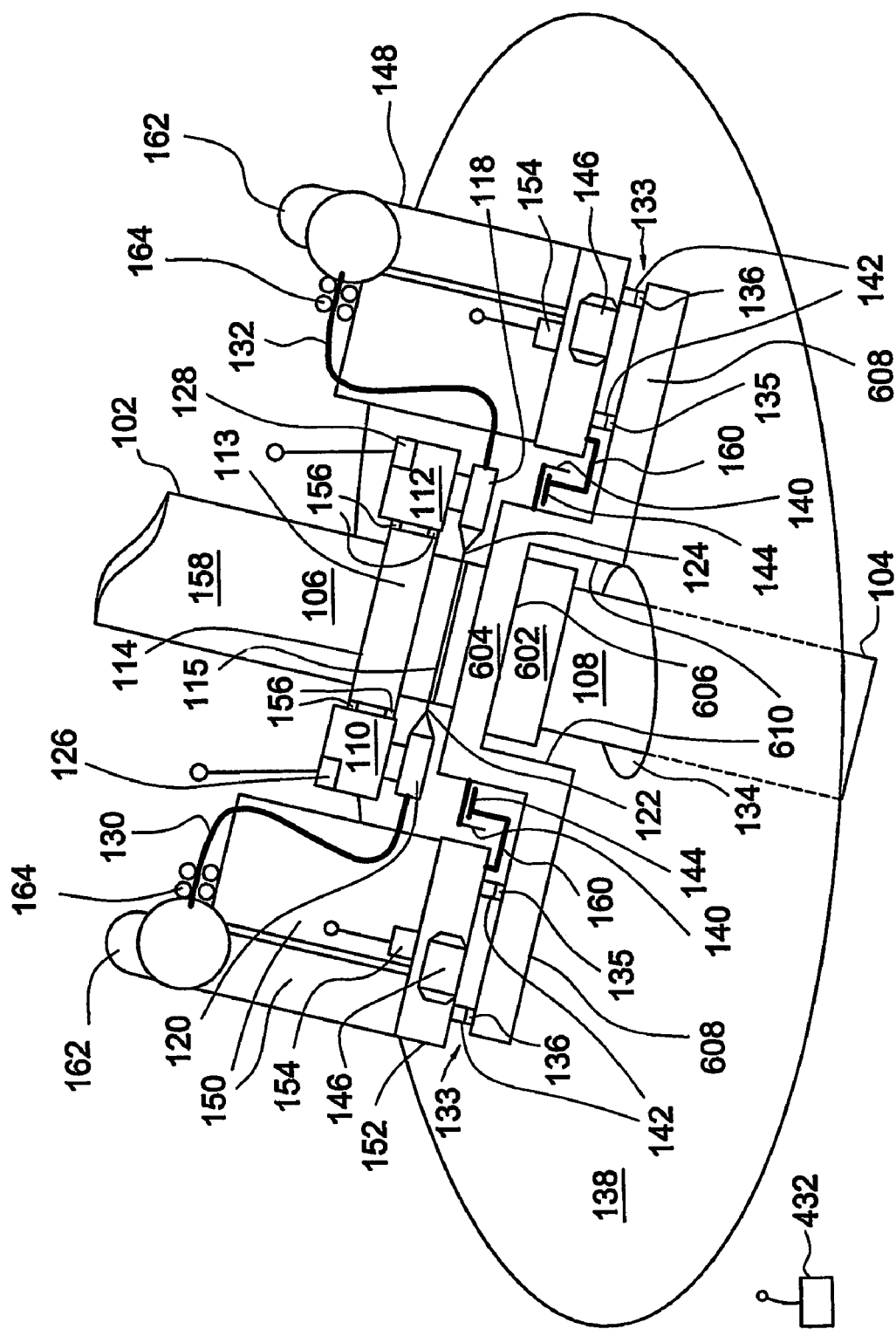
FIG. 5 shows a schematic perspective view of a welding apparatus in a fifth embodiment of the present invention.

FIG. 5 shows a lower pipe section 104 which is provided with a collar 602, which is located close to the welding area 115. The underside of the collar 602 is used to support the pipeline of which the pipe section 104 forms part hanging from a vessel to the ocean floor. In the embodiment shown in FIG. 5, the collar 602 is also used in the welding process. A guiding device 133 in the form of a substantially circular collar platform 604 is removably attached to, and supported by the collar 602 of the lower pipe section 104. The collar platform 604 may have the shape of a horseshoe. The platform is mounted on the collar in a movement perpendicular to the axis of the pipe section 104.

The collar platform 604 is equipped with an inner track 135, and an outer track 136, which are loop-shaped around the pipe section 102, 104 and carry the welding equipment carriers 148, 152. The collar platform 604 is also equipped with a power feed line 140, which preferably is attached to the collar platform 604 and is loop-shaped, running around the pipe section 104. The collar platform 604 may have a neck and shoulder form, wherein the neck part 606 rests on the pipe collar 602 and the shoulder part 608 is in a lower position than the neck part 606. The connection between the neck part 606 and the shoulder part 608 of the collar platform 604 is formed by a platform part 610.

The collar platform 604 ensures that the tracks 135, 136 are positioned in a plane perpendicular to the longitudinal axis of the pipe sections 102, 104, thereby ensuring that the welding equipment carriers 148, 152 have the same axial position with respect to the pipe sections 102, 104 regardless of their angular position around the pipe sections 102, 104. Since the pipe sections 102, 104 may have a slight inclination to a vertical line, as indicated in FIG. 5, the collar platform 604 and hence the welding equipment carriers 148, 152 may also have a slight inclination. The collar platform 604 is fixed with respect to the pipe sections 102, 104.

The welding equipment carriers 148, 152 are equipped with a power line 160, which provides an electrical connection from the welding equipment carriers 148, 152 to corresponding slide contacts 144. The slide contacts 144 are slidably attached to the power feed line 140.

A welding wire reel 162 is located on each welding equipment carrier 148, 152. The welding apparatus 100 comprises a control system and the welding heads 110, 112 each comprise a control module 126, 128. The welding equipment carriers 148, 152 also each comprise a control module 154. A separate console 432 is present to enable a welding operator to control the welding process from a remote location.

The equipment carriers 148, 152 are each driven by a drive mechanism 146, and the welding heads 110, 112 are also driven by a drive mechanism (not shown). The welding equipment carriers 148, 152 are equipped with wheels 142 which roll on the tracks 135 and 136.

The apparatus shown in FIG. 5 operates as follows. Before the welding process can begin, the pipe sections 102, 104 are brought into position. Then, the collar platform 604 is mounted on the pipe collar 602. The welding head guide assembly 113 is also mounted on the lower end 106 of the upper pipe section 102. Next, the welding heads 110, 112 and the welding equipment carriers 148, 152 are prepared for welding. The welding process may begin by a signal transmitted from the remote console 432 by the welding operator. During welding, welding heads 110, 112 revolve around the pipe sections 102, 104. The welding equipment carriers 148, 152 move around the pipe sections 102, 104 at approximately the same speed as the welding heads 110, 112. The welding torches 118, 120 create the weld 116 in multiple layers. This may require several complete rotations of each welding head 110, 112 around the pipe section 102.

During welding, electrical power, gas, cooling fluid and welding wire are supplied from the welding equipment carriers 148, 152 to the respective welding heads 110, 112.

During the welding process, the control of the various components of the apparatus may be similar to the control of the corresponding components of e.g. FIGS. 1 and 2. When the welding process is completed, the welding operator may transmit a stop signal from the console 432 to the control modules 126, 128, 154.

The distances between the welding equipment carriers 148, 154 and the corresponding welding heads 110, 112 may be relatively short.

It is also possible to manually push the welding equipment carriers 148, 152. It is also possible to electronically control the position of the welding equipment carriers 148, 152 to stay near the corresponding welding head 110, 112.

In the embodiment shown in FIG. 5, the platform 138 carries no equipment or tracks. The welding operators can stand on the platform, e.g. for monitoring and controlling the welding process. Preferably, the platform 138 rotates with the welding operators on it, preferably in synchronism with the average movement of the welding equipment carriers 148, 152.

Figure 6:
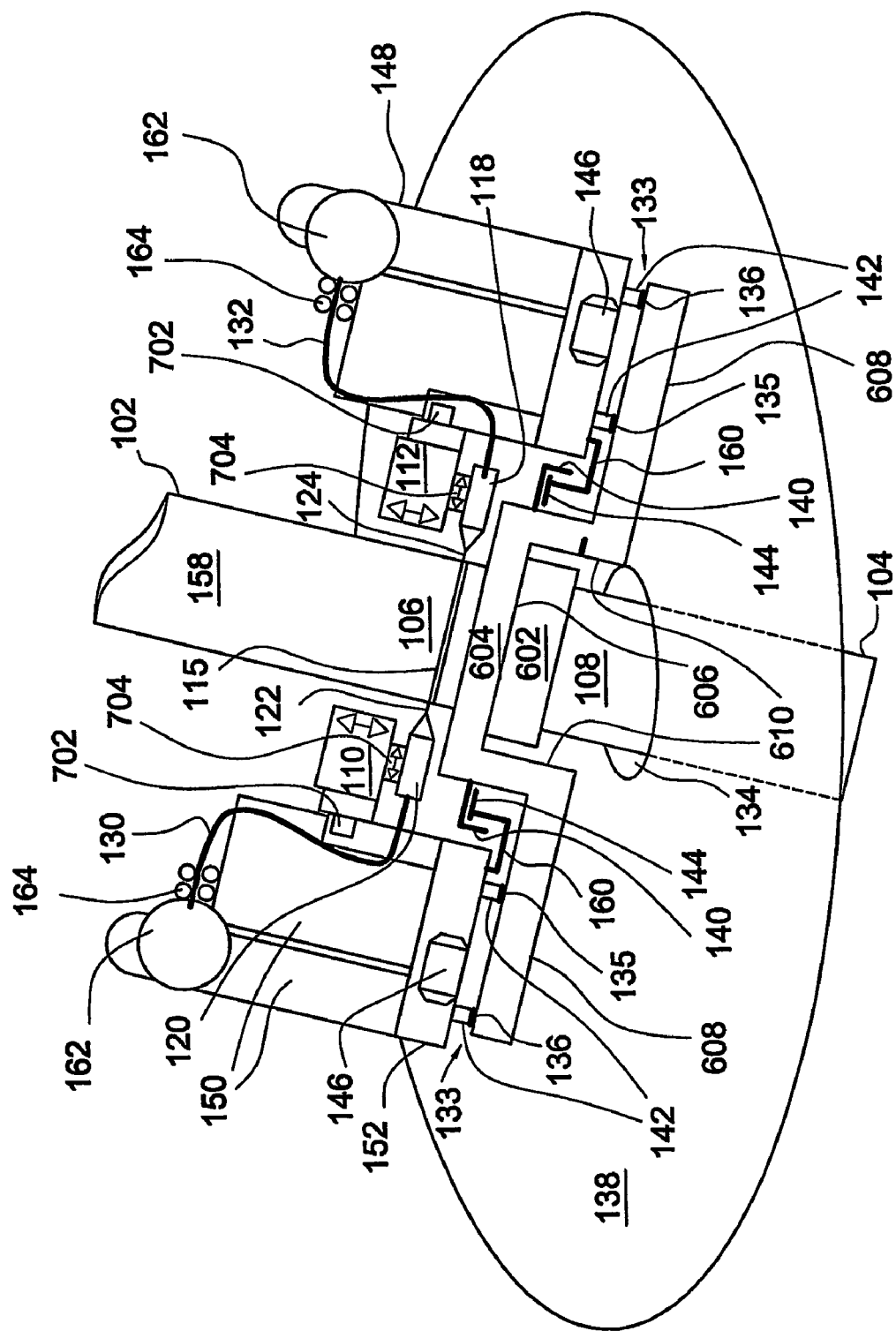
FIG. 6 shows a schematic perspective view of a welding apparatus in a sixth embodiment of the present invention.

FIG. 6 shows a welding apparatus in which the welding heads 110, 112 are directly connected to the respective corresponding welding equipment carriers 148, 152. In this embodiment there is just one rotational movement of the combination of the welding head and welding equipment carrier around the pipe sections 102, 104, whereas in the embodiments described above with reference to FIGS. 1-5 independent rotational movements around the pipe sections 102, 104 were made by the welding heads 110, 112 on the one hand, and the welding equipment carriers 148, 152 on the other hand.

The guiding device 133 comprises a collar platform 604. The collar platform 604 is removably mounted on the pipe collar 602. The welding equipment carriers 148, 152 are mounted on the tracks 135, 136 which are loop-shaped and are mounted on the collar platform 604. The collar platform 604 may have a neck and shoulder shape, with the neck part 606 resting on the pipe collar 602 and the shoulder parts 608 having a lower position with respect to the pipe collar 602.

The welding heads 110, 112 are connected to the welding equipment carriers 148, 152, and may perform a movement with respect to the welding equipment carriers 148, 152, co-axially with the pipe sections 102, 104. These movements are indicated by the substantially upright larger arrows, and may be enabled by a drive mechanism 702.

The welding heads 110, 112 may also perform a movement in a radial direction relative to the pipe sections 102, 104, in order to enable the welding torches 120, 118 to be positioned at a smaller or larger distance from the weld 116. These radial movements may be enabled by separate drive mechanism 704. The drive mechanisms may position the welding torches 118, 120 relative to the respective welding heads 110, 112, or may position the welding heads 110, 112 relative to the respective welding equipment carriers 148, 152, as long as the radial position of the welding torches 118, 120 may be accurately determined relative to the welding area 115.

If the pipe collar 602 has accurate dimensions in relation to the upper end 108 of the lower pipe section 104, the welding process may be performed completely automatically, that is, the welding operator may transmit a start signal, and the welding process may be performed in a number of revolutions around the pipe sections, thereby completing the weld 116.

A rotary platform 138 may rotate with the welding equipment carriers 148, 152, preferably in synchronism, enabling the welding operators to monitor the welding process without having to walk.

Figure 7:
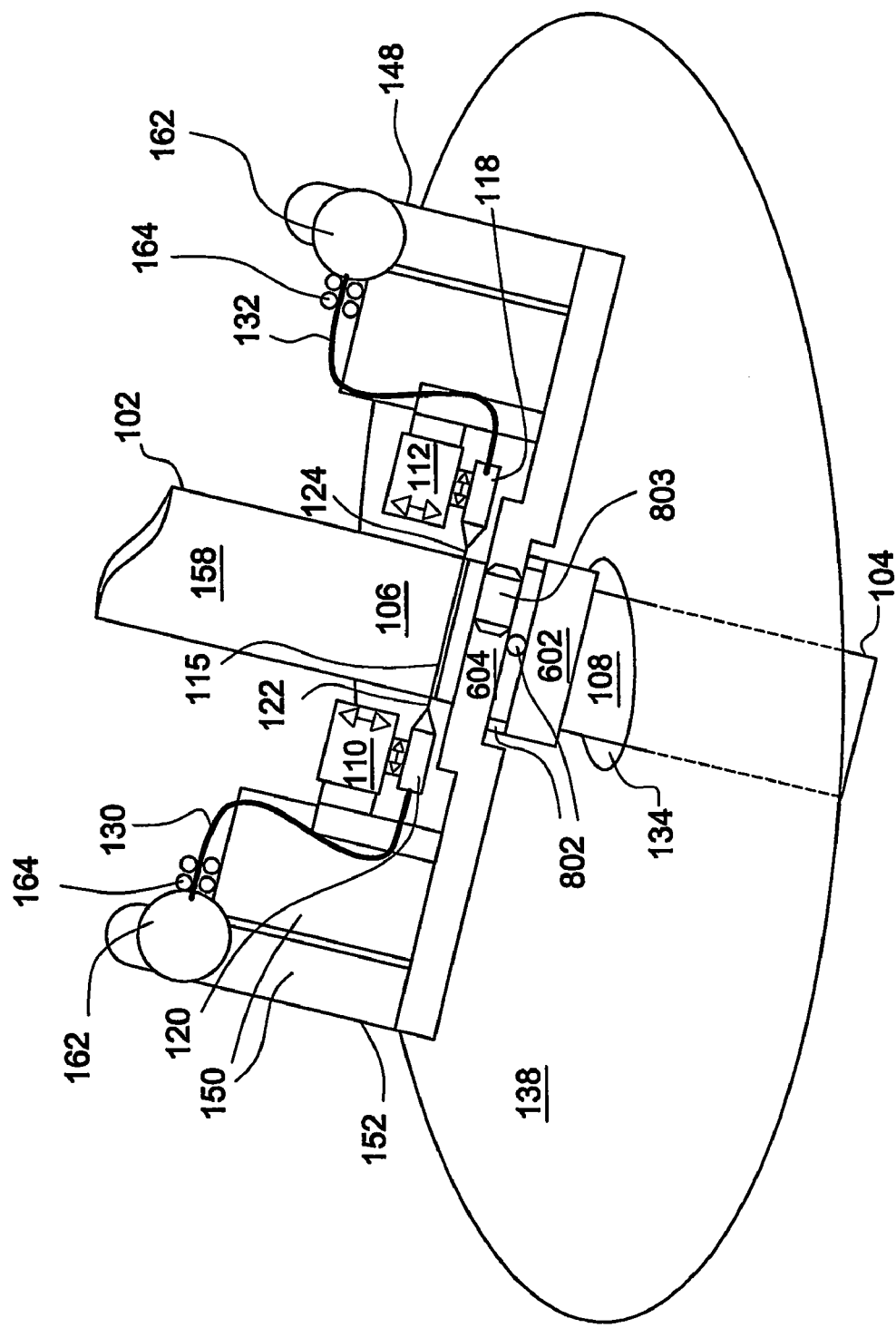
FIG. 7 shows a schematic perspective view of a welding apparatus in a seventh embodiment of the present invention.

FIG. 7 shows an apparatus according to the invention, in which the welding equipment carriers 148, 152 are fixed to the collar platform 604. The welding heads 110, 112 cannot rotate independently from each other around the pipe sections 102, 104 or independently from the welding equipment carriers 148, 152. They are connected to the welding equipment carriers 148, 152 and the collar platform 604 and make the same rotational movement as the welding equipment carriers 148, 152 and the collar platform 604.

The welding torches 118, 120 can be accurately positioned in the lateral and axial direction of the pipe sections 102, 104 in the same manner as in FIG. 6, in order to enable a well-controlled welding process. The collar platform 604 rests on wheels 802 and is rotatable around the pipe collar 602. The collar platform 604 is equipped with a controllable collar platform drive 803 for driving the collar platform 604 along the pipe collar 602 for performing the welding process.

Figure 8:
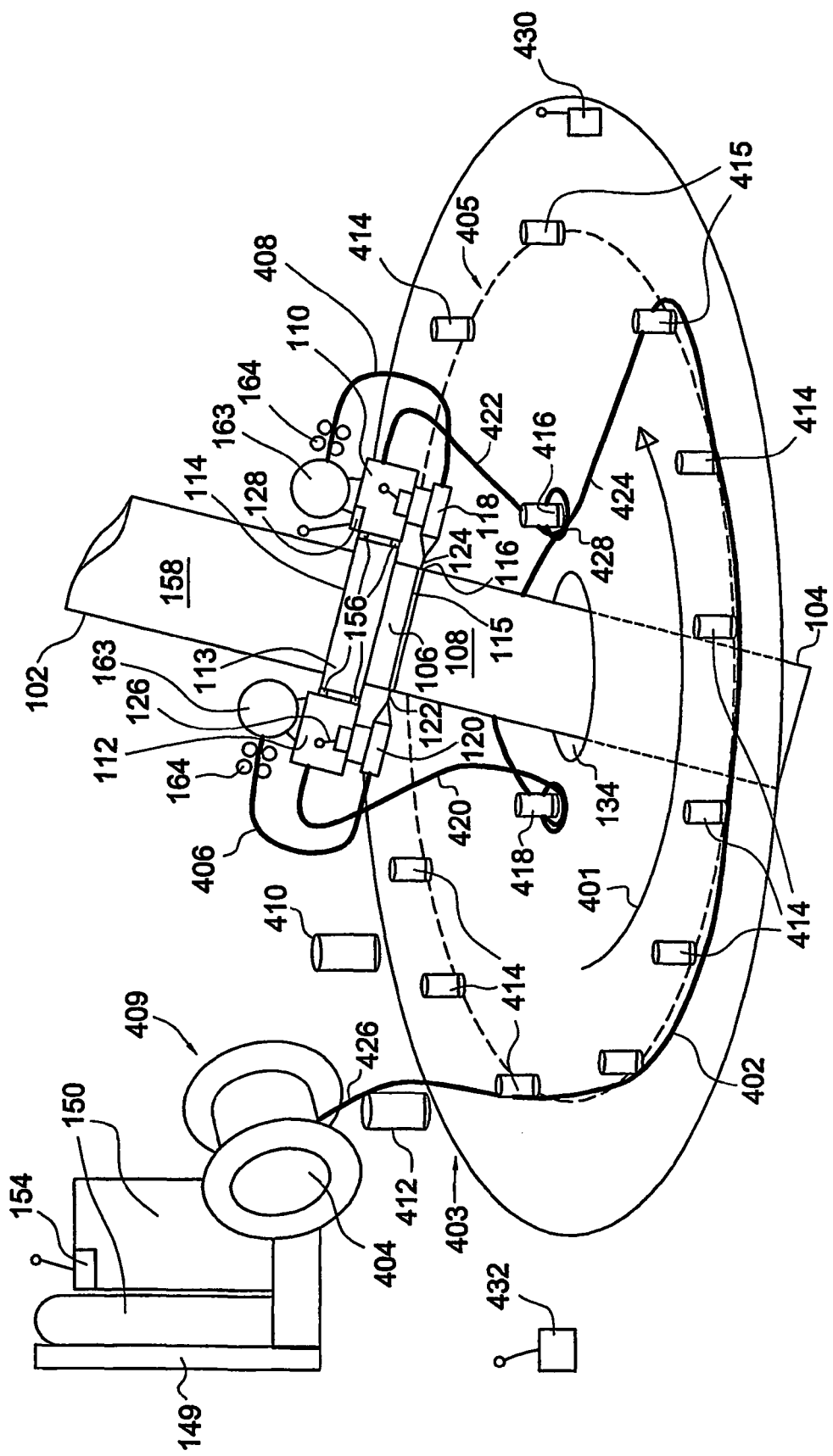
FIG. 8 shows a schematic perspective view of a welding apparatus in an eighth embodiment of the present invention.

FIG. 8 shows a welding apparatus 100, in which an equipment station 149 is mounted stationary in a substantially fixed position. The equipment station 149 comprises a power feed connection (not shown), electrical converters, gas storage means and means for cooling and circulating a cooling fluid. A power feed connection is not connected to a power feed line as in the previous Figures, but can be directly connected to a power supply.

The equipment station 149 comprises an umbilical storage 409, which comprises a large umbilical reel 404, for storing an umbilical 402. The umbilical reel may be biased to pull the umbilical with a certain force, thereby causing a certain length of umbilical to roll onto the umbilical reel whenever this length of umbilical is available.

An umbilical guide assembly 403 extends around one of the upper or lower pipe sections 102, 104. The umbilical guide assembly comprises a support structure 405, which is adapted to guide the umbilical around the circumference thereof. The support structure may be circular or have another shape, as long as it can support the umbilical 402 around the pipe sections 102, 104.

The umbilical guide assembly 403 may be rotatable in a controllable way, and mounted below the upper end 108 of the lower pipe section 104. On the umbilical guide assembly 403, the support structure 405 defines a loop shape around the central opening 134 by way of guiding means. The guiding means are provided in the form of guiding posts 414.

The guiding posts 414 extend from the support structure 405 in an upward direction, and are suitable for guiding the umbilical 402. The guiding posts 414 may be of steel, wood, or any other suitable material, and preferably have a cylindrical shape. The guiding posts 414 may have rounded edges to prevent any damage to the umbilical 402. Two of the guide posts 414 have the function of a turning guiding post 415, and enable the umbilical 402 to turn from the loop shape defined by the guiding posts 414, and to run towards inner guiding posts 416, 418.

The welding head guide assembly 113 is mounted above the lower end 106 of the upper pipe 102. It is also possible to mount the welding head guide assembly 113 below the upper end 108 of the lower pipe section 104.

Two welding heads 110, 112 are movably mounted on the welding head guide assembly 113. The welding heads 110, 112 each carry a welding wire reel 163, for supplying welding wire to the associated welding torch 118, 120. The welding wire is guided to the welding torches 118, 120 through welding wire feed lines 406, 408, which are connected to the welding wire reels 163 in one end and to the respective welding torches 118, 120 at the other end. The welding wire (not shown) is driven by the wire feeder 164 into the wire feed lines 406, 408 to the welding torches 118, 120.

The inner guiding posts 416, 418 are mounted close to the central opening 134 of the umbilical guide assembly 403. The inner guiding posts 416, 418 may have substantially the same shape as the guiding posts 414 and 415, and are suitable to guide the umbilical 402. One of the inner guiding posts 416, 418 (inner guiding post 416 in FIG. 8) is used to fix a part 424 of the long umbilical 402 to this guiding post 416, and consequently to the umbilical guide assembly 403.

The umbilical 402 may also be attached directly to the umbilical guide assembly 403 at or near the location of the inner guiding posts 416, 418. In such a case, the inner guiding posts 416, 418 may be absent.

Near the equipment station 149, two outer guide posts 410, 412 are mounted to guide the umbilical 402, which is connected to the umbilical reel 404. The outer guiding posts 410, 412 may have substantially the same shape as guiding posts 414, and are suitable for guiding the umbilical 402 from the equipment station 149 to umbilical guide assembly 403.

The umbilical 402 comprises two end portions, a first end portion 426, which is located at the umbilical reel 404 of the equipment station 149, and a second end portion 424. The second end portion 424 splits into two bridging umbilicals 420, 422. The bridging umbilicals 420, 422 connect the second end portion 424 of the umbilical 402 to the two welding heads 110, 112. If a different number of welding heads is used, the number of bridging umbilicals 420, 422 will differ correspondingly. At the division of the second end portion 424 of the long umbilical 402, the bridging umbilicals 420, 422 are securely connected and attached to the umbilical 402.

A welding wire reel 163 is mounted on the welding heads 110, 112. Therefore the umbilical 402, containing only fluid lines and electrical lines, can have a much longer length than in the embodiments of the invention according to FIGS. 1-4, where the necessary conveyance of the welding wire through the umbilical may pose a limitation on the umbilical length.

The apparatus of FIG. 8 operates as follows. When the pipe sections 102 and 104 have been brought in place with the pipe ends 106, 108 in an abutting position, and the welding head guide assembly 113 is mounted on the end 106 of the pipe section 102, the welding heads 110, 112 are put in place. The welding heads 110, 112 are each positioned substantially above an inner guiding post 416, 418.

It is assumed that a weld 116 is to be made in the welding area 115 defined by the abutting ends 106, 108 in a forward direction, indicated with arrow 401, the welding heads 110, 112 running along the welding area 115 for a number of revolutions. First, the umbilical guide assembly 403 is rotated in a backward direction, opposite to the arrow 401, for half the number of revolutions to be made to provide the full weld 116. During this rotation, the long umbilical 402 is pulled from the umbilical reel 404 and is guided around the guiding posts 414. The outer guide post 410 guides the long umbilical 402 to the umbilical guide assembly 403 and the guiding posts 414 guide the umbilical 402 in the loop-shape defined by the guiding posts 414 around the central opening 134 in the umbilical guide assembly 403.

The umbilical 402 is guided around one of the turning guide posts 415 and towards one of the inner guiding post 416, 418. It is securely attached to this inner guiding post 416, 418, and the inner guiding post 416, 418 is able to bear large forces exerted on the inner guiding post 416, 418 by the umbilical 402.

When the umbilical guide assembly 403 is rotated and the umbilical 402 is pulled from the umbilical reel 404, the umbilical 402 will be under high tension. The umbilical 402 will exert this force on the umbilical reel 404, on the inner guiding post 416, 418 and on one of the turning guiding posts 415 and also on the guiding posts 414.

The umbilical reel 404 may be equipped with a spring (not shown), which winds up the umbilical 402 when the umbilical guide assembly 403 is rotated in a direction in which the umbilical 402 is unwound from the guiding posts 414.

The combination of these components leads to a situation wherein the umbilical 402 can unwind from the umbilical reel 404 while at the same time winding on the guiding posts 414, or wind on the umbilical reel 404 while at the same time unwinding from the guiding posts 414.

When the umbilical guide assembly 403 has been rotated backwards for half the number of total revolutions to be made, the welding process can begin.

During welding, the umbilical guide assembly 403 is controlled to have substantially the same angular speed as the welding heads 110, 112 in the direction of the arrow 401. This ensures that the bridging umbilicals 420 and 422 which run from the inner guiding posts 416, 418 to the respective welding heads 110, 112 do not exceed a certain length. During the welding process the umbilical guide assembly 403 and the welding heads 110, 112 rotate around the pipe sections 102, 104, and a weld 116 is formed.

The welding process can be divided in two phases. During the first phase, the umbilical 402 unwinds from the guiding posts 414 and is pulled onto the umbilical reel 404. When the welding process is halfway, the turning guiding posts 415 will be in a position facing the fixed outer guiding posts 410, 412. At this point, the umbilical 402 has been rolled onto the umbilical reel 404 maximally, and unwound from the guiding posts 414 maximally as well.

When the welding continues in the direction of the arrow 401, and the turning guide posts 415 move away from the fixed guiding posts 410, 412, the second phase of the welding process begins, and the umbilical 402 is pulled from the umbilical reel 404 and wound on the guiding posts 414. In this way, the umbilical guide assembly 403 can make a number of rotations around the pipe sections 102, 104, such that the weld 116 can be made continuously, without starts and stops.

The umbilical reel 404 may also be equipped with a drive (not shown) for retracting the umbilical 402. The number of rotations which need to be performed around the pipe sections 102, 104 in order to complete the weld 116 depend on the number of welding heads, the thickness of the wall of the pipe, and the thickness of the weld layer which can be created by the welding torch 118, 120 in the welding area 115 during one pass of the welding operation. Other factors may also influence the number of required revolutions to complete the weld 116. Generally speaking, a number of at least four revolutions may be required.

The umbilical 402 is sturdy and resistant to dynamic loads, since the fluid and electrical connections inside the umbilical 402 or supported by the umbilical 402 between the equipment station 149 and the welding heads 110, 112 are subject to wear and tear due to the varying loads imposed thereon.

A control system is present, which comprises a control module 126, 128 in each welding head 110, 112, a control module 154 in the equipment station 149, a control module 430 for the umbilical guide assembly 403, and a control module 432 comprising a console for a welding operator. All modules 126, 128, 154, 430 and 432 communicate with one another wirelessly or in another known way during the welding process. Also, instead of separate control modules, a centralized control module may be provided.

One of the functions of the control system is to keep the speed of the different components of the welding apparatus in line with each other. The umbilical guide assembly 403 should rotate at substantially the same speed as the welding heads 110 and 112. Also, the umbilical reel 404 should supply the umbilical 402 at the same speed as the travelling speed of the guiding post 414. The welding wire reels 163 may also be controllable, for supplying welding wire through the welding wire feed lines 406, 408 at a required speed.

It is observed that the backward rotation described above is not absolutely necessary. It is also possible to start the creation of the weld 116 when the umbilical 402 is almost entirely rolled up on the umbilical reel 404, and then unroll the umbilical 402 from the umbilical reel 404, and wind it on the guiding posts 414 by rotating the umbilical guide assembly 403 for a number of revolutions in one direction around the pipe sections 102, 104 until the weld 116 has been completed. This requires a longer length of umbilical 402, but does not require fundamental changes in the arrangement of FIG. 8. It is also possible to first unroll the umbilical 402 from the umbilical reel 404 and wind it in a first direction on the guiding post 414 by rotating umbilical guide assembly 403, and then start the welding while at the same time rotating the umbilical guide assembly 403 in the opposite direction, unwinding the umbilical 402 from the guiding posts 414 and winding it on the umbilical reel 404.

The umbilical guide assembly 403 is free of other equipment, and welding operators may use it as a working platform.

Figure 9:
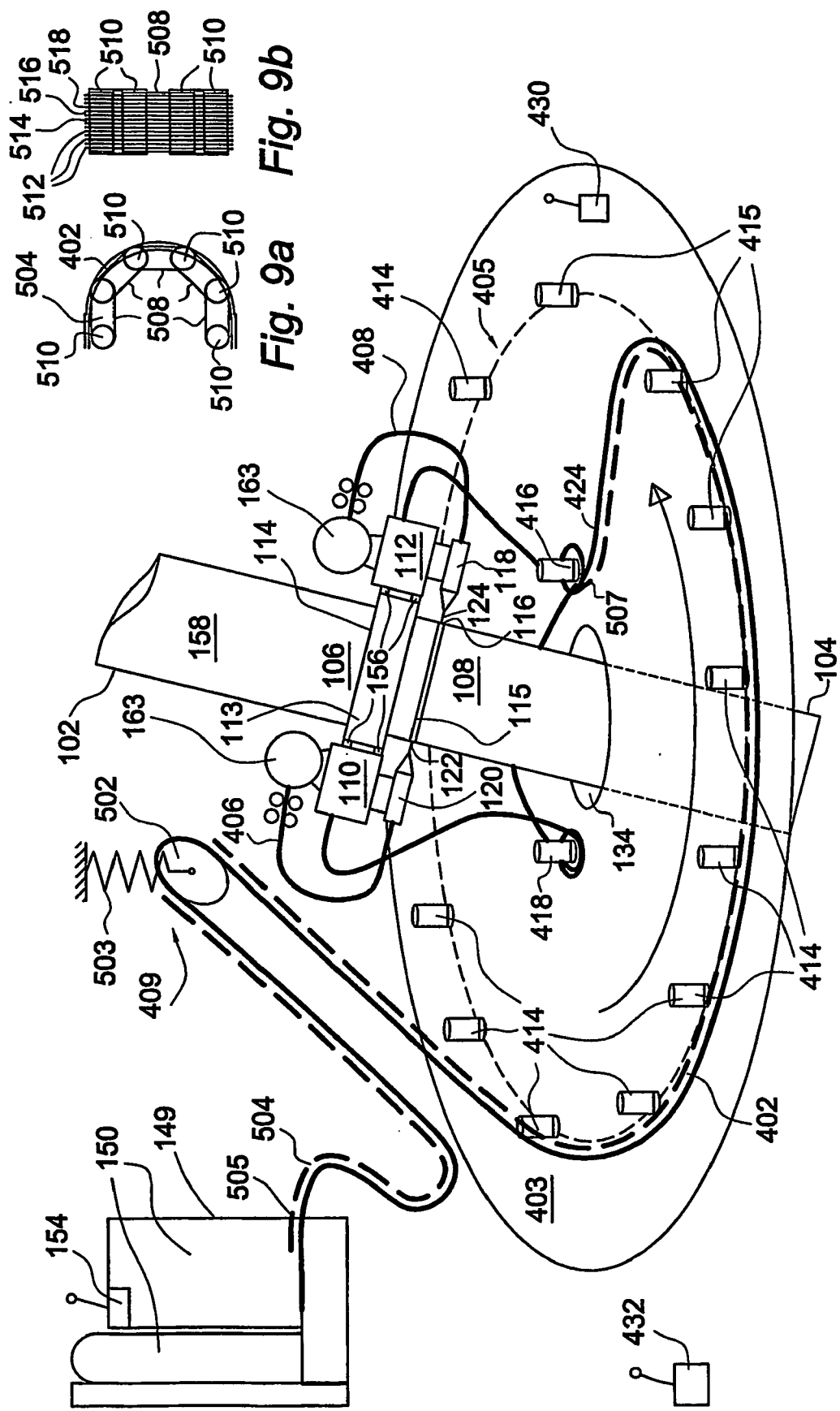
FIG. 9 shows a schematic perspective view of a welding apparatus in a ninth embodiment of the present invention.

FIGS. 9, 9a and 9b show a similar welding apparatus 100 as FIG. 8 in which the umbilical 402 is supported by a support chain 504. The support chain 504 is connected to the equipment station 149 at one end portion 505 and connected to an inner guiding post 416 at another end portion 507. The support chain 504 is able to bear tensile forces exerted on it by the equipment station 149 and the inner guiding post 416. The support chain also limits the bending radius of the umbilical as it allows for limited angular pivoting between its links 508. In this variant, the umbilical 402 itself is not subjected to substantial tensile and bending forces during operation. This provides the advantage of longer longevity of the umbilical 402, and the lines within it. The support chain 504 may also be provided in the embodiment of FIG. 8.

A sheave 502 is provided to guide the umbilical 402 from the equipment station 149 to the umbilical guide assembly 403. The sheave 502 is held by a spring 503. When the umbilical guide assembly 403 rotates and unwinds the umbilical 402 from the guiding posts 414, the sheave 502 is displaced by the spring 503, to store the extra available length of the umbilical 402. The sheave 502 with the spring 503 ensures that a certain tensile strength is always exerted on the support chain 504. It is also possible to apply the sheave 502 and spring 503 in the embodiment of FIG. 8.

FIG. 9a shows a detailed side view of the support chain 504 supporting the umbilical 402. The support chain 504 comprises links 508, which are connected to one another by pivotable joints 510. The support chain 504 has the ability to bend in each of its joints 510, and preserves a minimal bending radius, in order to prevent excess loads on the umbilical 402.

FIG. 9b shows a detailed top view of the support chain 504. The different lines in the umbilical are visible. The connections comprise an electrical power supply line 512, a gas supply line 514, a cooling fluid supply line 516 for supplying a cooling fluid to a welding torch and a cooling fluid return line 518 for the return of cooling fluid to the equipment station 149. The different connections 512, 514, 516 and 518 follow the curvature of the support chain 504.

The operation of the apparatus of FIG. 9 essentially is the same as the operation of the apparatus of FIG. 8. The welding apparatus according to FIG. 9 can make a limited number of rotations around the pipe sections 102 and 104, thereby enabling a continuous weld joint to be created between pipe ends 106 and 108.

Figure 10:
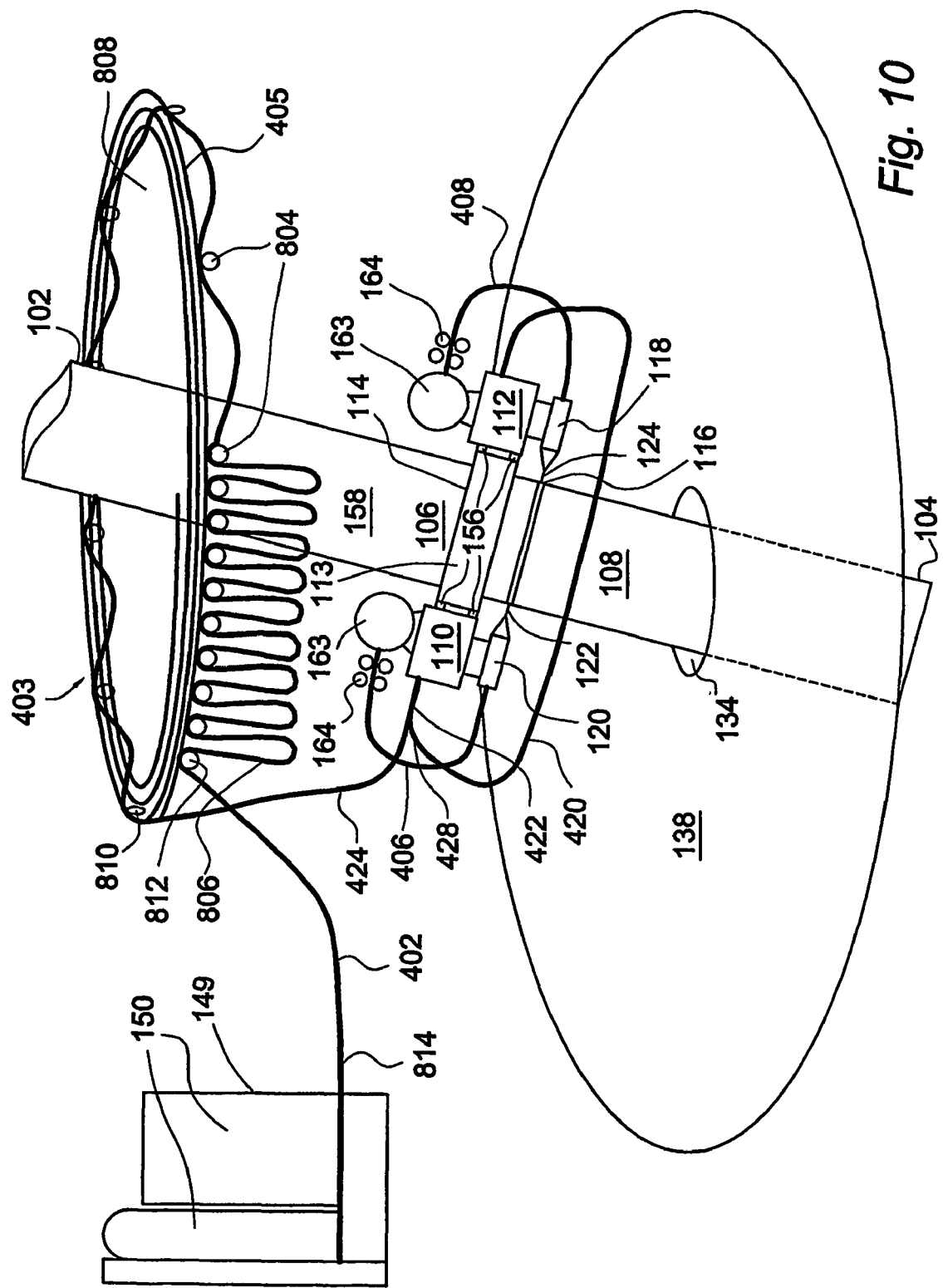
FIG. 10 shows a schematic perspective view of a welding apparatus in a tenth embodiment of the present invention.

FIG. 10 shows a welding apparatus, wherein the equipment station 149 and the welding heads 110, 112 are connected to each other by means of an umbilical 402.

The welding heads 110, 112 are movably mounted on a welding head guide assembly 113. The welding heads 110, 112 each comprise a welding wire reel 163 for storing welding wire, and a wire feeder 164 for guiding the welding wire along welding wire feed lines 406, 408, connecting the welding wire reels 163 with respective welding torches 120, 118.

The umbilical 402 holds (not shown) ducts for an electric power supply line 512, gas supply line 514, a cooling fluid supply line 516 and a cooling fluid return line 518. The umbilical 402 is capable of supplying the welding heads 110, 112 with above mentioned fluids and electricity when the welding heads 110, 112 perform one or more rotations around the pipe sections 102, 104.

A support structure 405 has a spiral form, with a central opening 808, and is mounted in a fixed position in a manner not shown in detail around the pipe section 102. On the support structure 405, movable guiding means in the form of holders 804 are placed, which can freely move about the support structure 405. The umbilical 402 is attached to each holder 804, preferably at regular distances. The support structure 405 may be positioned above the welding heads 110, 112, but may also be positioned at the same level or below the welding heads 110, 112.

The holders 804 may be movable on the support structure 405 by wheels, or may be sliding supports which slide along the support structure 405.

When the holders 804 move along the support structure 405, the distance between two holders 804 may increase or decrease. This will cause the umbilical 402 to fold or unfold in an open loop. If the distance between two holders 804 increases, the umbilical 402 will unfold, and when the distance between two holders 804 decreases, the umbilical 402 will fold. When the distance between two adjacent holders 804 is at a minimum, they may touch one another, causing the umbilical 402 to be maximally folded, and the umbilical 402 may then hang from these two holders in a large loop 806.

When the distance between two holders 804 is at a maximum, the umbilical 402 will be unfolded maximally and will be stretched such, that the above-mentioned loop shape will essentially disappear.

The umbilical 402 has a first end portion 814 which is connected to the equipment station 149, and from here it extends to a first holder 812 on the support structure 405, and from the first holder 812 to the next holders 804. A last holder 810 guides the umbilical 402 from the support structure 405 to the welding heads 110, 112.

The umbilical 402 has a last end portion 424, where it divides in a dividing means 428 into bridging umbilicals 420, 422. If a different number of welding heads is used, a different number of bridging umbilicals will be present. In the dividing means 428 the electrical power line 512, the gas supply line 514, and the cooling fluid supply and return lines 516, 518 are each divided into two electrical power lines, two gas supply lines and two cooling fluid supply and return lines, each running in one of the bridging umbilicals 420, 422.

At least one of the holders 804 may be driven by a drive. Each drive may be controllable from a remote location.

The sheave 502 and spring 503 of FIG. 9 can also be applied in FIG. 10.

The apparatus of FIG. 10 operates as follows. During welding, the welding heads 110, 112 rotate around the pipe sections 102, 104. The umbilical 402 must follow this rotation in order to maintain the connection between the equipment station 149 and the welding heads 110, 112. This is achieved by moving the holders 804 on the support structure 405 in such a manner, that the distances between the holders 804 increase, when more length of umbilical 402 is required, and decrease, when less length of umbilical 402 is required. The welding heads 110, 112 may exert a pulling force on the umbilical 402, or the umbilical 402 which is attached to the holder 810 may be pulled manually. Also, the holder 810 may be equipped with a drive as mentioned above. The holder 810 may also be provided with a drive and a control system enabling it to follow the welding heads 110, 112 automatically.

In use, the holder 810 will maintain approximately the same angular speed as the welding heads 110, 112. The angular speed of the holders 804 will decrease in the direction from the holder 810 to the first holder 812. The first moving holder 812 may not move, but stay in a fixed position with respect to the welding equipment station 149.

When the umbilical 402 is long enough and suspended in sufficient loops 806, the welding heads 110, 112 can make a number of rotations around the pipe sections 102, 104, such that the weld 116 can be made in one continuous pass, without starts and stops.

When the welding heads 110, 112 rotate backwards, the holders 804 will rotate along the support structure 405 in a backwards direction. The holders 804 may then meet and/or touch one another, and push each other back into their starting positions. The umbilical 402 then again hangs in a large number of loops from the holders 804.

A platform 138 may be provided. The platform 138 may be stationary, but preferably rotates in the same direction and with the same speed as the welding heads 110, 112. When the platform 138 rotates along with the welding heads 110, 112, welding operators standing on the platform 138 can monitor and control the welding process, while automatically staying in the same relative position to the welding area as the welding heads 110, 112.

Figure 11:
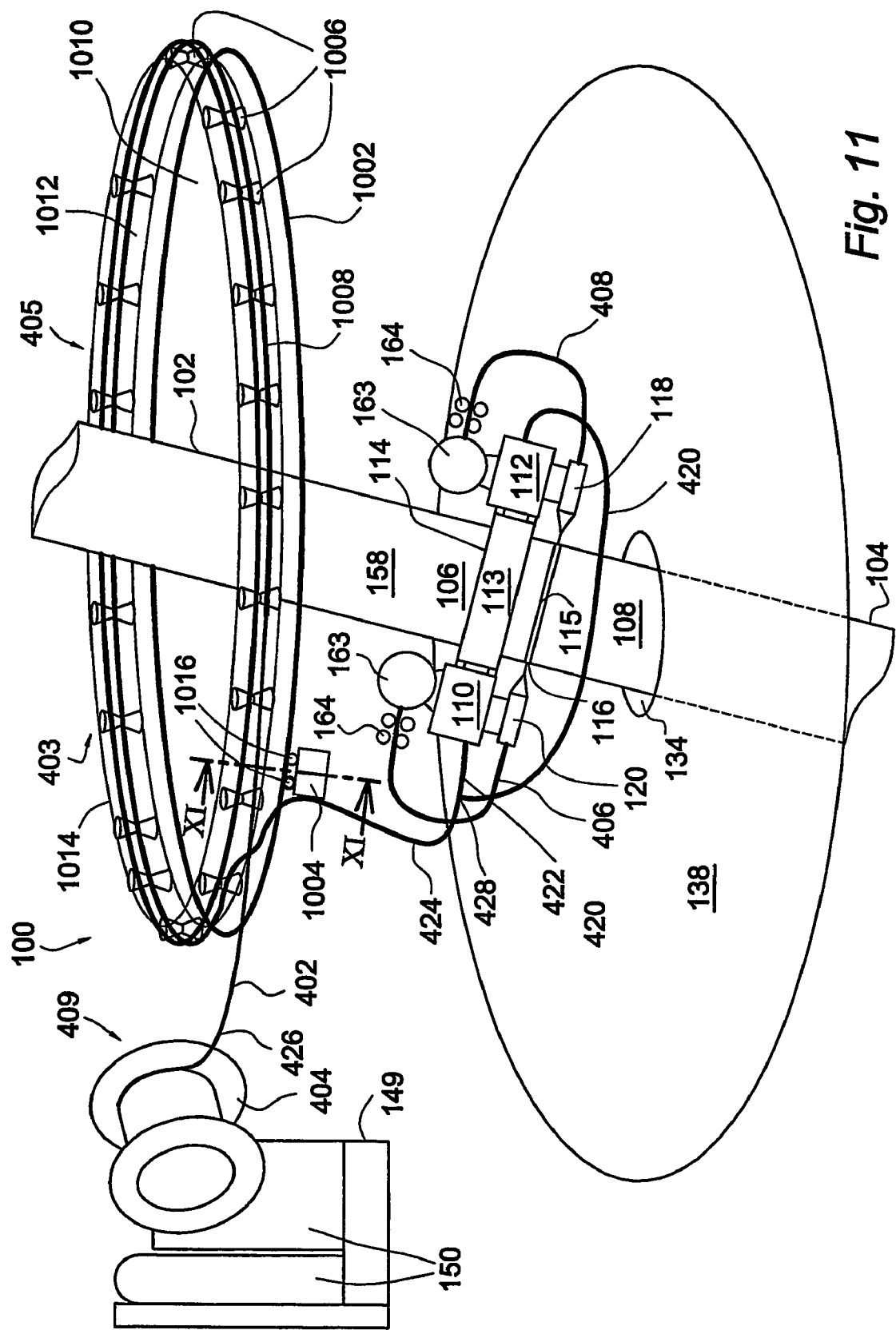
FIG. 11 shows a schematic perspective view of a welding apparatus in a tenth embodiment of the present invention.

FIG. 11 shows a welding apparatus having an umbilical 402. The umbilical 402 has a first end portion 426 and a last end portion 424. An umbilical storage 409 is provided, comprising an umbilical reel 404. The umbilical reel 404 may be biased or equipped with a controllable drive. This umbilical reel 404 may also be provided in FIGS. 9 and 10. The first end portion 426 is connected to the umbilical reel 404, on which the umbilical 402 can be wound. The last end portion 424 is connected to a dividing means 428, which divides the umbilical 402 into two bridging umbilicals 420, 422. The bridging umbilicals 420, 422 are connected to the welding heads 110, 112.

A support structure 405 is embodied in the form of a winding means 1012. The winding means 1012 being loop-shaped around a central opening 1010 is positioned around one of the pipe sections 102, 104. The winding means 1012 comprises a frame 1014 fixed in space in a manner not shown in detail, which frame 1014 comprises guiding means 1006.

The guiding means 1006 may be rollers which are positioned on the frame 1014 in regular intervals along the winding means 1012. The guiding means 1006 may be rotary, and may freely rotate around a substantially vertical axis. The guiding means 1006 may have the form of a diabolo. Any other shape of the guiding means is also possible, as long as the guiding means 1006 are able to guide the umbilical 402. The guiding means 1006 may also be movable along the winding means 1012.

Close to the winding means 1012, a loop-shaped rail 1002 is positioned. The rail 1002 carries a movable umbilical guide trolley 1004.

The umbilical guide trolley 1004 can rotate around the pipe sections 102 and 104. It may roll along the rail 1002 by wheels 1016. The umbilical guide trolley 1004 guides the umbilical 402 from the winding means 1012 to the welding heads 110, 112. The long umbilical 402 is attached to the umbilical guide trolley 1004.

The umbilical 402 extends from the umbilical reel 404 to the winding means 1012, and may extend for several windings 1008 around the winding means 1012. From here it extends to the umbilical guide trolley 1004 to which it is fastened, and extends from the umbilical guide trolley 1004 to the welding heads 110, 112. The umbilical guide trolley 1004 may be freely rotatable on the loop-shaped rail 1002 or may be driven around the loop shaped rail by driving means (not shown).

The apparatus of FIG. 11 operates as follows. At the start of a welding cycle, the pipe sections 102, 104 are placed in their required position, with the ends 106, 108 abutting one another. The winding means 1012 is put in position and the welding heads 110, 112 are prepared for welding. The umbilical 402 has a large portion of its length rolled onto the umbilical reel 404. It extends from the umbilical reel 404 to the winding means 1012, where it may have zero windings, and from the winding means 1012 it extends to the umbilical guide trolley 1004, and from the umbilical guide trolley 1004 to the welding heads 110, 112.

When the welding is started, the welding heads 110, 112 rotate around the pipe section 102, 104. The umbilical guide trolley 1004 is moved in a controllable way along the loop-shaped rail 1002 at approximately the same angular speed as the welding heads 110, 112, thereby keeping the distance between the umbilical guide trolley 1004 and the welding heads 110, 112 relatively constant. As the umbilical guide trolley 1004 moves along the loop-shaped rail 1002, the long umbilical 402 is pulled from the umbilical reel 404 and wound on the winding means 1012. The entire welding cycle may require a number of complete revolutions around the winding means 1012, resulting in a number of windings of the long umbilical 462 on the winding means 1012.

The guiding means 1006 guide the one or more windings on the winding means 1012. The guiding means 1006 must be able to guide the umbilical 402 smoothly, preventing large tensile forces to occur. The umbilical guide trolley 1004 must have enough pulling strength to pull the umbilical 402 around the winding means 1012 and from the umbilical reel 404.

The umbilical reel 404 may be equipped with a drive (not shown) to facilitate the winding and unwinding of the long umbilical 402 by the umbilical guide trolley 1004. The drive of the umbilical reel 404, the drive of the umbilical guide trolley 1004, and the drives of the welding heads 110, 112, may be controlled by means of a control system (not shown), in order to synchronize all moving parts of the welding apparatus. The above-mentioned drives may also be controlled from a console by means of a control system, in order to enable a welding operator to control the different positions and movements of the parts of the welding apparatus.

The winding means 1012 may be positioned above the welding heads 110, 112, or may be positioned at the same level as the welding heads 110, 112 or in a position lower then the welding heads 110, 112. The winding means 1012 may also be positioned below a rotary platform 138, provided that the umbilical 402 can run from the umbilical guide trolley 1004 to the welding heads 110, 112 in an orderly fashion.

The equipment station 149 is located in a fixed position. It is connected to an external power supply. Welding wire reels 163 are mounted on the welding heads 110, 112, and feed a welding wire to the welding heads 110, 112 through a welding wire feed line 406, 408. Each welding wire feed line 406, 408 is connected on one end to a welding wire reel 163, and on the other end to one of the two welding heads 110, 112.

The winding means 1012 can be opened on one side for mounting it around the pipe sections 102, 104. It can then be closed in order to provide the shape of a closed loop.

A sheave 502 and spring 503 (FIG. 9) may also be provided in the apparatus of FIG. 11.

During the welding operation, the umbilical guide trolley 1004 may be given several rotations around the pipe sections 102, 104 in a backwards direction opposite to the direction during the welding, prior to the actual welding process, and then make several rotations in a forward direction during welding. In this manner the required length of the umbilical 402 can be limited substantially.

The umbilical guide trolley 1004 may also be provided in FIG. 10. In FIG. 10, it may replace the moving holder 810.

Figure 11A:
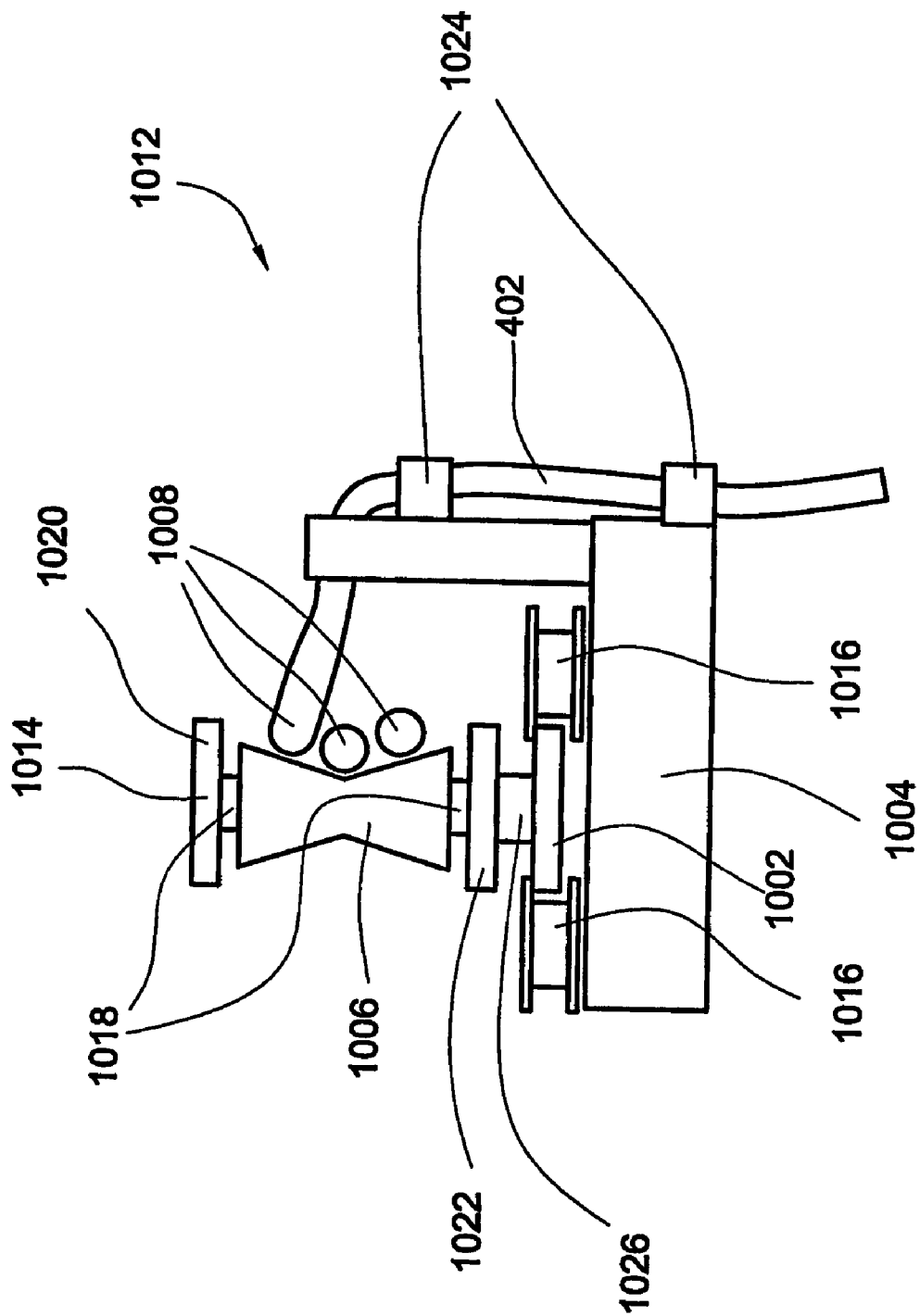
FIG. 11a shows a detailed cross-sectional view of a part of the welding apparatus of FIG. 11, taken along line XI-XI.

FIG. 11a shows a cross-section of the winding means 1012, which comprises the frame 1014. The frame 1014 comprises an upper bar 1020 and a lower bar 1022. Guiding means 1006 are positioned between the upper bar 1014 and the lower bar 1022 which can rotate on hinges 1018 on a substantially vertical axis.

The umbilical guide trolley 1004 is movably connected to a rail 1002 suspended on fixed supports 1026 from the lower bar 1022 of the frame 1014. The lower bar 1022, the fixed connection 1026 and the loop-shaped rail 1002 may also be integrated into one piece. The umbilical guide trolley 1004 can run on wheels 1016, in order to rotate around the pipe sections 102, 104 (not shown). The umbilical 402 is securely attached to the umbilical guide trolley 1004 by means of fixing posts 1024. The fixing posts 1024 can exert a force on the umbilical 402, in order to pull it from the umbilical reel 404. The umbilical guide trolley 1004 may be provided with a drive (not shown). The umbilical 402 may be wound on the winding means 1012 for several windings 1008.

The wheels 1016 may be replaced with sliding supports, provided these are able to move along the loop-shaped rail 1002.

The loop-shaped rail 1002 is attached to the lower bar 1022 of the frame 1014 by means of a fixed connection 1026.

It will be obvious to a person skilled in the art that numerous changes in the details and the arrangement of the parts may be varied over considerable range without departing from the spirit of the invention and the scope of the claims.

The invention claimed is:

1. An apparatus for joining pipe sections together which are arranged in a generally upright position, a lower end (106) of an upper pipe section (102) being lined up with an upper end (108) of a lower pipe section (104), the upper end and the lower end forming a welding area (115), the apparatus comprising:
    at least two welding equipment carriers (148, 152) each supported by at least one conveying device adapted to roll or glide (142);
    at least two welding heads (110, 112), each welding head (110, 112) comprising a cart and at least one welding torch which is supported by the cart, where each welding head is connected to a respective one of the welding equipment carriers (148, 152) only by at least one umbilical (130, 132);
    a circular, substantially circular, or substantially oval-shaped welding head guide assembly (113) having a central opening, which is adapted to be fixed to one of said upper or lower pipe sections, the welding head guide assembly being constructed to support the carts for guiding each welding head (110,112) along said welding area (115);
    a stationary guiding device (133) having at least one circular, substantially circular, or substantially oval-shaped rail or track (135, 136) for guiding the at least one conveying device of said at least two welding equipment carriers (148, 152) around said welding area (115);
    wherein the at least two welding equipment carriers (148, 152) are movable independently from each other along the at least one circular, substantially circular, or substantially oval-shaped rail or track.

2. The apparatus of claim 1, wherein the stationary guiding device (133) is mounted below the welding area (115), and the welding equipment carriers (148, 152) are supported by the stationary guiding device (133).

3. The apparatus of claim 1, wherein the stationary guiding device (133) is mounted above the welding area (115), and the welding equipment carriers (148, 152) are suspended from the stationary guiding device.

4. The apparatus of claim 1, wherein the at least one conveying device comprises at least one wheel (142) to be guided by the at least one circular, substantially circular, or substantially oval-shaped rail or track.

5. The apparatus of claim 1, wherein an electrical power feed line (140) extends around said welding area (115) and wherein each welding equipment carrier (148, 152) comprises a slide contact (144) for establishing an electrical connection between the power feed line (140) and the welding equipment carrier (148, 152).

6. The apparatus of claim 1, wherein each welding head (110, 112) comprises a controllable welding head drive for moving the welding head along the welding head guide assembly (113) with a controllable speed.

7. The apparatus of claim 1, wherein each welding equipment carrier (148, 152) comprises a controllable welding equipment carrier drive (146) for moving the welding equipment carrier along the guiding device (133) with a controllable speed.

8. The apparatus of claim 1, wherein each welding head (110, 112) comprises a controllable welding head drive for moving the welding head (110, 112) along the welding head guide assembly (113) with a controllable speed, and each welding equipment carrier (148, 152) comprises a controllable welding equipment carrier drive (146) for moving the welding equipment carrier along the guiding device (133) with a controllable speed, and wherein each welding head drive is coupled to a respective one of the welding equipment carrier drives (146) for each welding equipment carrier (148, 152) to keep substantially a same angular position relative to the welding area (115) as the associated welding head (110, 112).

9. The apparatus of claim 1, wherein a platform (138) for supporting an operator near the welding area (115) is provided, an upper side of the platform extending in a substantially horizontal plane.

10. The apparatus of claim 9, wherein said platform (138) is rotatable around the lower pipe section (104).

* * * * *